(12) United States Patent
Wisniewski

(10) Patent No.: US 11,582,228 B2
(45) Date of Patent: Feb. 14, 2023

(54) DISTRIBUTED IDENTITY SYSTEM WITH LOCAL IDENTIFICATION

(71) Applicant: Alclear, LLC, New York, NY (US)

(72) Inventor: Rob Wisniewski, New York, NY (US)

(73) Assignee: ALCLEAR, LLC, New York, NY (US)

( * ) Notice: Subject to any disclaimer, the term of this patent is extended or adjusted under 35 U.S.C. 154(b) by 301 days.

(21) Appl. No.: 16/679,551

(22) Filed: Nov. 11, 2019

(65) Prior Publication Data

US 2020/0213301 A1 Jul. 2, 2020

Related U.S. Application Data

(60) Provisional application No. 62/785,723, filed on Dec. 28, 2018.

(51) Int. Cl.
*H04L 29/06* (2006.01)
*H04L 9/40* (2022.01)
*H04L 9/08* (2006.01)

(52) U.S. Cl.
CPC ........ *H04L 63/0861* (2013.01); *H04L 9/0894* (2013.01)

(58) Field of Classification Search
CPC combination set(s) only.
See application file for complete search history.

(56) References Cited

U.S. PATENT DOCUMENTS

| | | | |
|---|---|---|---|
| 6,119,096 A * | 9/2000 | Mann | G07C 9/37 705/5 |
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,744,966 B1 | 6/2014 | Amacker et al. | |
| 8,965,170 B1 | 2/2015 | Benea | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |
| 9,836,642 B1 | 12/2017 | Ramaswamy | |
| 9,934,504 B2 | 4/2018 | Wang et al. | |
| 9,967,250 B2 | 5/2018 | Johansson et al. | |
| 10,027,662 B1 | 7/2018 | Mutagi et al. | |

(Continued)

*Primary Examiner* — Piotr Poltorak

(74) *Attorney, Agent, or Firm* — Brownstein Hyatt Farber Schreck, LLP

(57) ABSTRACT

A distributed identity system with local identification includes an identity system device and at least one local electronic device. The local electronic device locally stores at least a portion of identity information and the biometric identification information stored by the identity system device. The local electronic device determines identities by comparing received digital representations of biometrics with locally stored biometric identification information, performs actions using locally stored identity information included in the local copy, and uploads data related to the actions to the identity system device upon occurrence of an upload condition.

20 Claims, 14 Drawing Sheets

(56) References Cited

U.S. PATENT DOCUMENTS

| | | | |
|---|---|---|---|
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 10,447,668 B1 * | 10/2019 | Norum | G06F 21/602 |
| 11,151,481 B1 | 10/2021 | Sun et al. | |
| 2003/0225596 A1 * | 12/2003 | Richardson | G16H 10/60 |
| | | | 705/2 |
| 2004/0221303 A1 | 11/2004 | Sie | |
| 2004/0264743 A1 * | 12/2004 | Arnouse | G07C 9/37 |
| | | | 382/116 |
| 2005/0216139 A1 * | 9/2005 | Laughlin | G06Q 30/00 |
| | | | 701/3 |
| 2006/0173793 A1 * | 8/2006 | Glass | G06F 16/9535 |
| | | | 705/75 |
| 2006/0248020 A1 * | 11/2006 | Robinson | G06Q 20/4014 |
| | | | 705/69 |
| 2010/0245041 A1 * | 9/2010 | Aoki | G07C 9/10 |
| | | | 340/5.82 |
| 2014/0189720 A1 | 7/2014 | Terrazas | |
| 2015/0294515 A1 | 10/2015 | Bergdale | |
| 2015/0372924 A1 * | 12/2015 | Newton | H04L 47/2408 |
| | | | 370/235 |
| 2016/0189063 A1 | 6/2016 | Nie | |
| 2017/0188103 A1 | 6/2017 | Pan | |
| 2017/0210483 A1 * | 7/2017 | Hamblin | G08G 5/0095 |
| 2018/0007060 A1 | 1/2018 | Leblang et al. | |
| 2019/0036939 A1 | 1/2019 | Johansson et al. | |
| 2019/0050631 A1 | 2/2019 | Hayase | |

\* cited by examiner

DISTRIBUTED IDENTITY SYSTEM WITH LOCAL IDENTIFICATION

CROSS-REFERENCE TO RELATED APPLICATION(S)

This application is a nonprovisional patent application of and claims the benefit of U.S. Provisional Patent Application No. 62/785,723, filed Dec. 28, 2018 and titled "Distributed Identity System with Local Identification," the disclosure of which is hereby incorporated herein by reference in its entirety.

FIELD

The described embodiments relate generally to identity systems. More particularly, the present embodiments relate to distributed identity systems with local identification.

BACKGROUND

Various electronic devices may use identity information for people to perform a number of different actions. Identity information may include a name, an address, entitlements (such as purchased tickets), financial information, and/or any other information associated with a person's identity. For example, a security kiosk may access identity information to determine a person's name as part of screening the person for entry into a secured area, such as an airport. Such electronic devices may protect the identity information to restrict use of the identity information. For example, an electronic device may require login to an account associated with the identity information prior to taking any action that uses the identity information.

In some situations, the identity information may be maintained and stored at the electronic device that uses the identity information. This enables the electronic device to perform actions using the identity information. In other situations, a central system maintains and stores the identity information and allows access to remote electronic devices. This enables multiple electronic devices to perform actions using the identity information.

SUMMARY

The present disclosure relates to a distributed identity system with local identification. The distributed identity system includes an identity system device and at least one local electronic device. The local electronic device locally stores at least a portion of identity information and the biometric identification information stored by the identity system device. The local electronic device determines identities by comparing received digital representations of biometrics with locally stored biometric identification information, performs actions using locally stored identity information included in the local copy, and uploads data related to the actions to the identity system device upon occurrence of an upload condition.

In various embodiments, a distributed identity system with local identification includes an identity system device that stores identity information and biometric identification information and a local electronic device. The local electronic device stores a local copy of at least a portion of the identity information and the biometric identification information, determines identities by comparing received digital representations of biometrics with the biometric identification information included in the local copy, performs actions using the identity information included in the local copy that corresponds to the identities; and uploads data related to the actions to the identity system device upon occurrence of an upload condition.

In some examples, the upload condition is at least one of elapse of a time period, completion of an event, an upload request received by the local electronic device from the identity system device, the data reaching a threshold size, or completion of a flight. In various examples, the identity system device determines an update to the local copy and transmits the update to the local electronic device. In some examples, the local electronic device is operative to change the upload condition.

In various examples, at least part of the identity information is encrypted using an encryption key and the encryption key is stored by the identity system device and the local electronic device. In some implementations of such examples, the local electronic device is operative to delete the encryption key stored by the local electronic device. In some such implementations, the local electronic device deletes the encryption key in response to an instruction received from the identity system device.

In some embodiments, an electronic device in a distributed identity system with local identification includes a non-transitory storage medium that stores instructions, a biometric reader device, a communication unit, and a processor. The processor executes the instructions to receive a local store, from an identity system device using the communication unit, that includes at least a portion of identity information and biometric identification information stored by the identity system device; determine identities by comparing digital representations of biometrics, received via the biometric reader device, with the biometric identification information included in the local store; perform actions using the identity information included in the local store that corresponds to the identities; and upload data related to the actions to the identity system device using the communication unit upon occurrence of an upload condition.

In various examples, the actions include allowing entrance based on a ticket and the processor updates a status of the ticket in the local store based on the entrance. In some examples, the identity information includes a verified age. In various examples, the identity information includes payment information.

In some examples, the electronic device further includes an access control mechanism and the actions include the processor controlling access by operating the access control mechanism. In various examples, the digital representations of the biometrics include a digital representation of at least one of a fingerprint, a voiceprint, a facial image, a retina image, an iris image, or a gait. In some examples, the biometric reader device includes at least one of a fingerprint scanner, an optical fingerprint scanner, a phosphorescent fingerprint scanner, a camera, an image sensor, or a microphone.

In various embodiments, an electronic device in a distributed identity system with local identification includes a non-transitory storage medium, a communication unit, and a processor. The non-transitory storage medium stores instructions, identity information, and biometric identification information. The processor executes the instructions to determine at least a portion of the identity information and the biometric identification information to store at a local electronic device; transmit the portion of the identity information and the biometric identification information to the local electronic device using the communication unit; after occurrence of an upload condition, receive data from the local electronic device using the communication unit, the data related to actions performed by the local electronic device using identity information included in the portion of the identity information and the biometric identification information that corresponds to identities determined by the local electronic device as a result of comparing received digital representations of biometrics to the biometric identification information included in the portion of the identity information and the biometric identification information; and process the data to update the identity information.

In some examples, the local electronic device is a component of an aircraft and the processor determines the at least the portion of the identity information and the biometric identification information to store at the local electronic device by selecting the identity information and the biometric identification information that corresponds to a flight manifest for the aircraft. In various examples, the local electronic device is a ticketing device for an event and the processor determines the at least the portion of the identity information and the biometric identification information to store at the local electronic device by selecting the identity information and the biometric identification information that corresponds to ticket holders for the event. In some examples, the local electronic device is a component of a vehicle and the processor determines the at least the portion of the identity information and the biometric identification information to store at the local electronic device by selecting the identity information and the biometric identification information that corresponds to permitted operators of the vehicle. In various examples, the local electronic device is a component of a secured area and the processor determines the at least the portion of the identity information and the biometric identification information to store at the local electronic device by selecting the identity information and the biometric identification information that corresponds to permitted entrants to the secured area.

In some examples, the local electronic device is a first local electronic device, the portion of the identity information and the biometric identification is a first portion of the portion of the identity information and the biometric identification, the upload condition is a first upload condition, the data is first data, the actions are first actions, the identities are first identities, and the received digital representations of the biometrics are first received digital representations of biometrics. In such examples, the processor is operative to determine at least a second portion of the identity information and the biometric identification information to store at a second local electronic device; transmit the second portion of the identity information and the biometric identification information to the second local electronic device using the communication unit; after occurrence of a second upload condition, receive second data from the second local electronic device using the communication unit, the second data related to second actions performed by the second local electronic device using identity information included in the second portion of the identity information and the biometric identification information that corresponds to second identities determined by the second local electronic device as a result of comparing second received digital representations of biometrics to the biometric identification information included in the second portion of the identity information and the biometric identification information; and process the second data to update the identity information.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
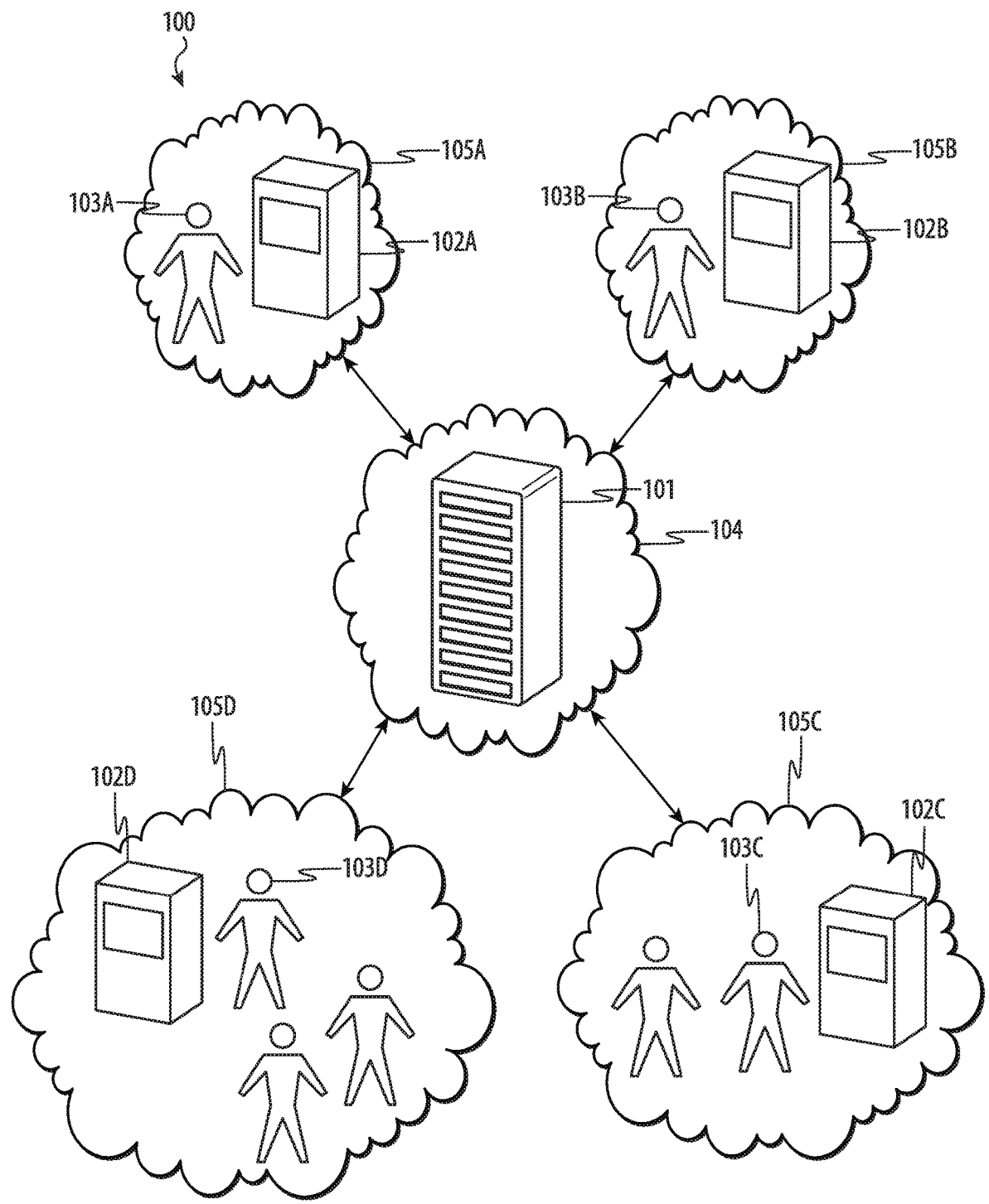
FIG. 1 depicts a first example distributed identity system with local identification.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Implementations where an electronic device maintains and stores identity information may not be very flexible as such implementations do not support multiple electronic devices using the identity information, particularly different kinds of electronic devices. Further, each electronic device may be configured with the identity information before use.

This may be burdensome and complex, as well as multiplying storage requirements for the identity information. Each time a new electronic device is to use the identity information, the new electronic device is separately configured to use the identity information.

Implementations where a central system maintains and stores the identity information may support use of the identity information by multiple electronic devices and/or different kinds of electronic devices. This may be very flexible as new electronic devices communicate with the central system for identity information rather than requiring a separate identity information configuration. However, electronic devices in such an arrangement may be unable to function if a communication link between the electronic device and the central system becomes unavailable. Further, the speed at which the electronic device operates may be dependent on the speed at which the electronic device may communicate with the central system.

The following disclosure relates to a distributed identity system with local identification. The distributed identity system includes an identity system device and at least one local electronic device. The local electronic device locally stores at least a portion of identity information and the biometric identification information stored by the identity system device. The local electronic device determines identities by comparing received digital representations of biometrics with locally stored biometric identification information, performs actions using locally stored identity information included in the local copy, and uploads data related to the actions to the identity system device upon occurrence of an upload condition. In this way, the system performs identifications locally without requiring communication between components of the system but also uses the system to centrally store and maintain the identity information and the identification information that is used to protect the identity information.

The above may allow local electronic devices to function even when communication between components of the system is unavailable. This may also allow local use of centrally maintained information, free up the local electronic devices from separately maintaining and storing the information, improve the speed of system and/or local electronic device performance by making the performance independent of the speed of communication between components of the system, improve the speed of system and/or local electronic device performance by reducing network communication traffic though communicating updates upon the occurrence of the upload condition rather than constantly communicating updates, and so on. This may also enable the local electronic devices to perform functions not previously performable as the identity information may be updated based on actions performed by other electronic devices that affect the identity information.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 depicts a first example distributed identity system 100 with local identification. The distributed identity system 100 may include one or more identity system devices 101 (which may be located at one or more centralized or first locations 104) and one or more local electronic devices 102A-D (which may be located at one or more remote or additional locations 105A-D). The identity system device 101 may store and maintain identity information (e.g., information about a person such as name, address, financial information, social security number, phone number, previous actions by a person, and so on) and identification information (i.e., information that may be used to determine the identity of a person). The local electronic devices 102A-D may store a local copy (or local store) of a portion of the identity information and part of the identification information obtained from the identity system device 101 (such as pushed from the identity system device 101, requested from the identity system device 101 by the respective local electronic device 102A-D, and so on). The local electronic devices 102A-D may respectively receive user input from a person 103A-D, determine an identity for the person 103A-D by comparing the user input to stored identification information in the local copy (or local store, as compared to that stored by the identity system device 101 being the main copy or main store), perform one or more actions using information in stored identity information in the local copy (or local store) that is associated with the identity of the person 103A-D, and upload data regarding any actions performed to the identity system device 101 upon occurrence of an upload condition (such as elapse of a time period, completion of an event, receipt of an upload request, data to upload reaching a threshold size, completion of a flight, and so on). The identity system device 101 may process the data to update the identity information. In this way, the local electronic devices 102A-D may be able to perform identifications locally without requiring communication with the identity system device 101. At the same time, the distributed identity system 100 may use the identity system device 101 to centrally store and maintain the identity information and the identification information and share and coordinate data between the local electronic devices 102A-D. The local electronic devices 102A-D uploading data upon occurrence of the upload condition may minimize communication network traffic and conserve available communication network bandwidth in the distributed identity system 100.

These features may allow the local electronic devices 102A-D to function even when communication between the local electronic devices 102A-D and the identity system device 101 is unavailable. This may also allow local use of centrally maintained information, free up the local electronic devices 102A-D from separately maintaining and storing the information, improve the performance speed of local electronic devices 102A-D by making the performance independent of the speed of communication between local electronic devices 102A-D and the identity system device 101, minimize communication network traffic, conserve available communication network bandwidth, and so on. This may also enable the local electronic devices 102A-D to perform functions not previously performable as the identity information may be updated based on actions performed by other local electronic devices 102A-D that affect the identity information.

In some implementations, one or more portions of the identity information and/or the identification information (whether stored by the identity system device 101 and/or in the local copy (or local store) stored by the local electronic devices 102A-D) may be encrypted using one or more encryption keys (such as symmetric encryption keys and so on). The identity system device 101 and/or the local electronic devices 102A-D may each store copies of the encryption key such that they can decrypt, encrypt, and/or use the identity information and/or the identification information. At the same time, the encrypted identity information and/or the identification information may be useless outside of the distributed identity system 100 even if obtained and the encrypted identity information and/or the identification information may be functionally deleted by deleting the encryption key.

The identity information may include a name, an address, entitlements (such as purchased tickets), financial information, and/or any other information associated with a person's identity. For example, the local electronic device 102A-D may be a security kiosk that may access identity information to determine a person's name as part of screening the person for entry into a secured area, such as an event venue, a building, an airport, and so on. By way of another example, the local electronic device 102A-D may be a point of sale device that may access identity information to determine a person's financial information as part of processing payment for a transaction. In yet another example, the local electronic device 102A-D may be a ticket processing station at an event venue that may access identity information to determine whether or not a person has a valid ticket for entrance. In still another example, the local electronic device 102A-D may be an age verification device that may access identity information to determine whether or not a person is of a threshold age, such as eighteen or twenty one. Various configurations are possible and contemplated without departing from the scope of the present disclosure.

By allowing use of identity information upon receipt of user input that matches associated identification information, the distributed identity system 100 may protect the identity information by restricting access to the identity information. For example, the local electronic device 102A-D may include a biometric reader device (such as a fingerprint scanner, a camera and/or other 2D or 3D image capture device, a microphone, a heart rhythm monitor or other biological sensor, and so on) that is operable to obtain or receive a digital representation of a biometric (such as one or more hashes or other digital representations of one or more fingerprints, facial images, iris images, retina images, voiceprints, gaits, heart rhythms or other biological information, and so on) from the person 103A-D and the stored identification information in the local copy (or local store) may include biometric data associated with identities corresponding to the stored identity information in the local copy. By way of another example, the local electronic device 102A-D may include one or more keyboards, touch screens, and/or other input/output devices and the person 103A-D may use such to provide login information for an account and the stored identification information in the local copy may include account information. Various configurations are possible and contemplated without departing from the scope of the present disclosure.

The identity information and the identification information stored by the local electronic device 102A-D in the local copy (or local store) may be determined and/or stored in a variety of different ways. In some implementations, the local electronic device 102A-D and/or the identity system device 101 may determine one or more parameters for identities to store in the local copy, obtain identity information and biometric identification information that corresponds to the parameters, and store the obtained identity information and biometric identification in the local copy at the local electronic device 102A-D. Such parameters may be associated with the function of the local electronic device 102A-D, the location 104A-D of the local electronic device 102A-D, a time period, and/or other factors. For example, the local electronic device 102A-D may be a ticket kiosk at an event venue and the parameters may include people who have a valid ticket for the event. By way of another example, the local electronic device 102A-D may be an airport security station and the parameters may include people who have a flight at that airport and/or that terminal and/or that gate within twenty four hours. In yet another example, the local electronic device 102A-D may be a point of sale device on a flight and the parameters may include a flight manifest of people scheduled to be on that flight. By way of another example, the local electronic device 102A-D may be a vehicle and the parameters may include a list of people who are permitted to operate the vehicle. In still another example, the local electronic device 102A-D may be a grocery store checkout device and the parameters may include people who frequent that particular grocery store. Various configurations are possible and contemplated without departing from the scope of the present disclosure.

One or more identity system devices 101 may use information obtained from one or more local electronic devices 102A-D in a variety of different ways. For example, in some implementations, local electronic devices 102A-D may be security screening devices at an airport. An identity system device 101 may receive information such as determined identity, ticket data (such as flight numbers, gate numbers, terminal numbers, flight times, and so on) from one or more such security screening devices and use such information to perform tasks, such as verifying that an identity is associated with a valid identification (such as a driver's license, passport, and so on), implementing a multiple lane screening system, and so on. For example, the identity system device 101 may use the information to adjust personnel and/or other resources to manage expected flow; create expedited lines based on which passengers are early, late, and so on; create expedited and/or other adjusted lines for staff as opposed to passengers; create different lines for differently levels of tickets, rewards or other loyalty programs, and so on; create different lines for different levels of security (such as routing trusted people to minimized screening lines and riskier people to additional screening lines, and so on); and so on. The identity system device 101 (and/or the local electronic devices 102A-D) may use information from one or more local electronic devices 102A-D in a variety of different ways to perform various functions that might not otherwise be possible without such information.

Additionally, although this example is provided in the context of airport security, it is understood that this is an example. Such techniques may be performed in other contexts (such as in the context of a stadium or other event venue, vehicle, and so on) without departing from the scope of the present disclosure. Various configurations are possible and contemplated.

Although the above illustrates and describes one or more local electronic devices 102A-D storing a local copy of information (such as identity information and/or identification information) and subsequently updating one or more identity system devices 101 regarding any actions performed, this an similar examples below are simplified examples for the purposes of clarity. In various implementations, one or more of the local electronic devices 102A-D may be a local network of electronic devices. For example, a central server computing device at a stadium may store a local copy of information (such as identity information and/or identification information) from one or more identity system devices 101, provide access to such a local copy of information to one or more stations and/or other electronic devices at the stadium, and then update the identity system device 101 for any actions performed by any of the stations and/or other electronic devices at the stadium. By way of another example, a server computing device on an aircraft may store a local copy of information (such as identity information and/or identification information) from one or more identity system devices 101, provide access to such local copy of information information to one or more stations and/or other electronic devices at individual passenger seats, and update the identity system device 101 for any actions performed by any of the stations and/or other electronic devices at individual passenger seats. Various configurations are possible and contemplated without departing from the scope of the present disclosure.

Further, although the above illustrates and describes one or more local electronic devices 102A-D storing a local copy of information (such as identity information and/or identification information) and subsequently updating one or more identity system devices 101 regarding any actions performed, this an similar examples below are simplified examples for the purposes of clarity. In various implementations, the identity system device 101 may communicate with one or more third party databases and/or other electronic devices to obtain information to provide in a local copy to a local electronic device 102A-D and/or to update based on one or more actions performed by a local electronic device 102A-D. Such third party databases and/or other electronic devices may include one or more black lists (such as a transportation and security administration no fly list), driver's license databases, criminal watch lists, payment processing systems, and/or any other kind of third party database and/or other electronic device. Various configurations are possible and contemplated without departing from the scope of the present disclosure.

Figure 2:
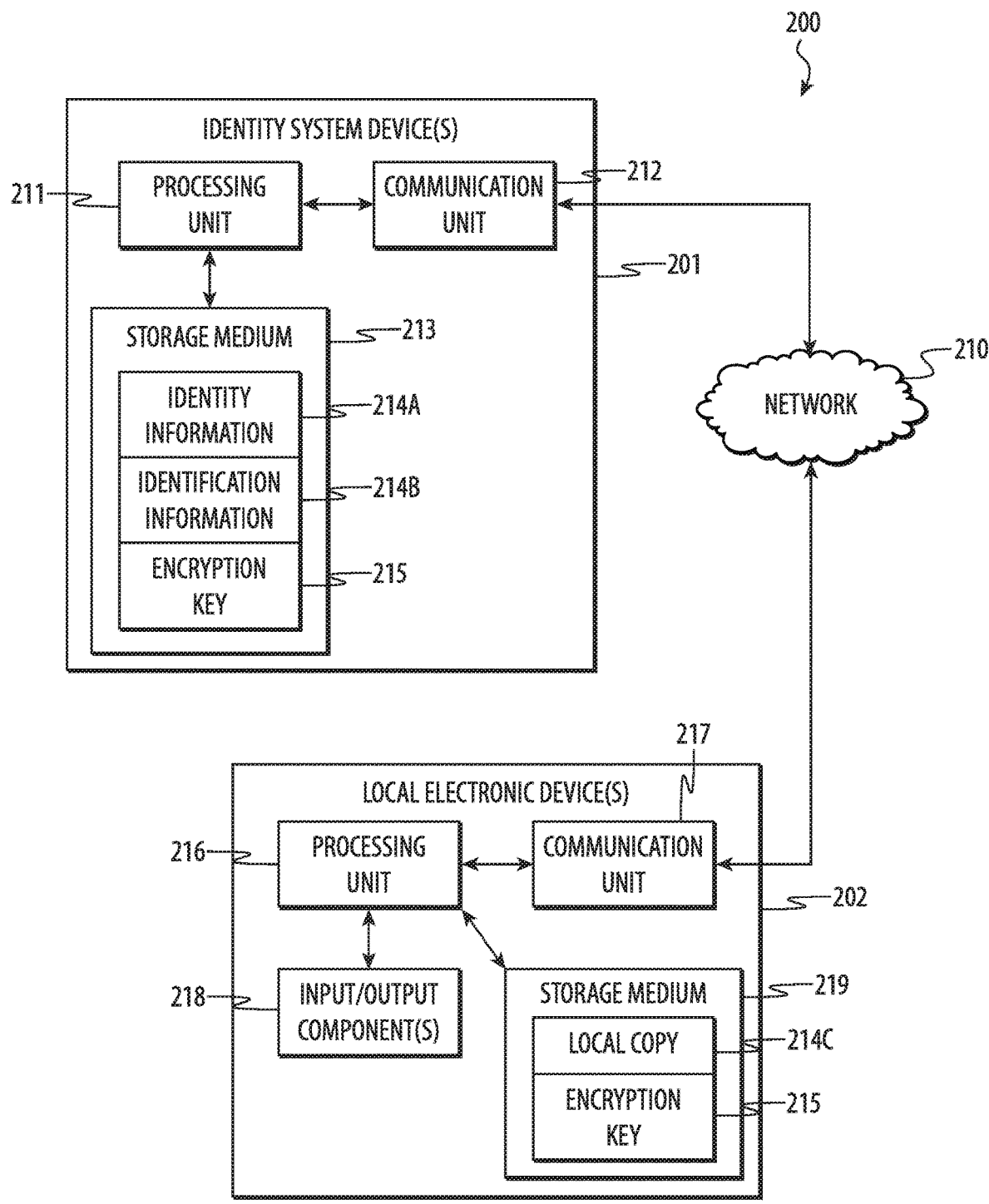
FIG. 2 depicts a second example distributed identity system with local identification.

FIG. 2 depicts a second example distributed identity system 200 with local identification. The distributed identity system 200 may include one or more identity system devices 201 that are operable to communicate with one or more local electronic devices 202 via one or more wired and/or wireless communication networks 210.

The identity system device 201 may include one or more processing units 211 or other processors or controllers, one or more communication units 212, one or more non-transitory storage media 213 (which may take the form of, but is not limited to, a magnetic storage medium; optical storage medium; magneto-optical storage medium; read only memory; random access memory; erasable programmable memory; flash memory; and so on), and so on. Similarly, the local electronic device 202 may include one or more processing units 216 or other processors or controllers, communication units 217, input/output components 218 (such as one or more keyboards; touch screens; mice; biometric reader devices like a fingerprint scanner, an optical fingerprint scanner, a phosphorescent fingerprint scanner, a camera and/or other 2D or 3D image capture device, an image sensor, a microphone, a heart rhythm monitor or other biological sensor, and/or any other device operative to obtain a digital representation of a biometric; and so on), non-transitory storage media 219, and so on.

The identity system device 201 may store identity information 214A, identification information 214B, and/or one or more encryption keys 215 in the storage medium 213. The identity information 214A may be associated with the identification information 214B. One or more portions of the identity information 214A and/or identification information 214B may be encrypted using the encryption key 215. The local electronic device 202 may store one or more local copies (or local stores) 214C on the storage medium 219. The local electronic device 202 may store a portion of the identity information 214A and/or identification information 214B in the local copy 214C.

The processing unit 216 of the local electronic device 202 may execute instructions stored in the storage medium 219 to perform various functions. For example, the functions may include communicating with the identity system device 201 via the network 210 using the communication unit 217, storing information in the local copy 214C, obtaining user input via the input/output component 218, determining an identity by comparing user input to stored identification information in the local copy 214C, performing one or more actions using information in stored identity information in the local copy 214C, the various functions discussed above as performed by the local electronic device 202 of FIG. 2, and so on. Similarly, the processing unit 211 of the identity system device 201 may execute instructions stored in the storage medium 213 to perform various functions. For example, the functions may include communicating with the local electronic device 202 via the network 210 using the communication unit 212, storing and/or maintaining the identity information 214A and/or the identification information 214B, the various functions discussed above as performed by the identity system device 101 of FIG. 1, and so on.

The local electronic device 202 may be any kind of electronic device without departing from the scope of the present disclosure. For example, the local electronic device 202 may be a desktop computing device, a laptop computing device, a mobile computing device, a tablet computing device, a mobile telephone, a smart phone, a digital media player, a wearable device, a vehicle, a kitchen appliance, a point of sale terminal, a kiosk, and so on. Similarly, the identity system device 201 may be any kind of electronic device without departing from the scope of the present disclosure.

Figure 3:
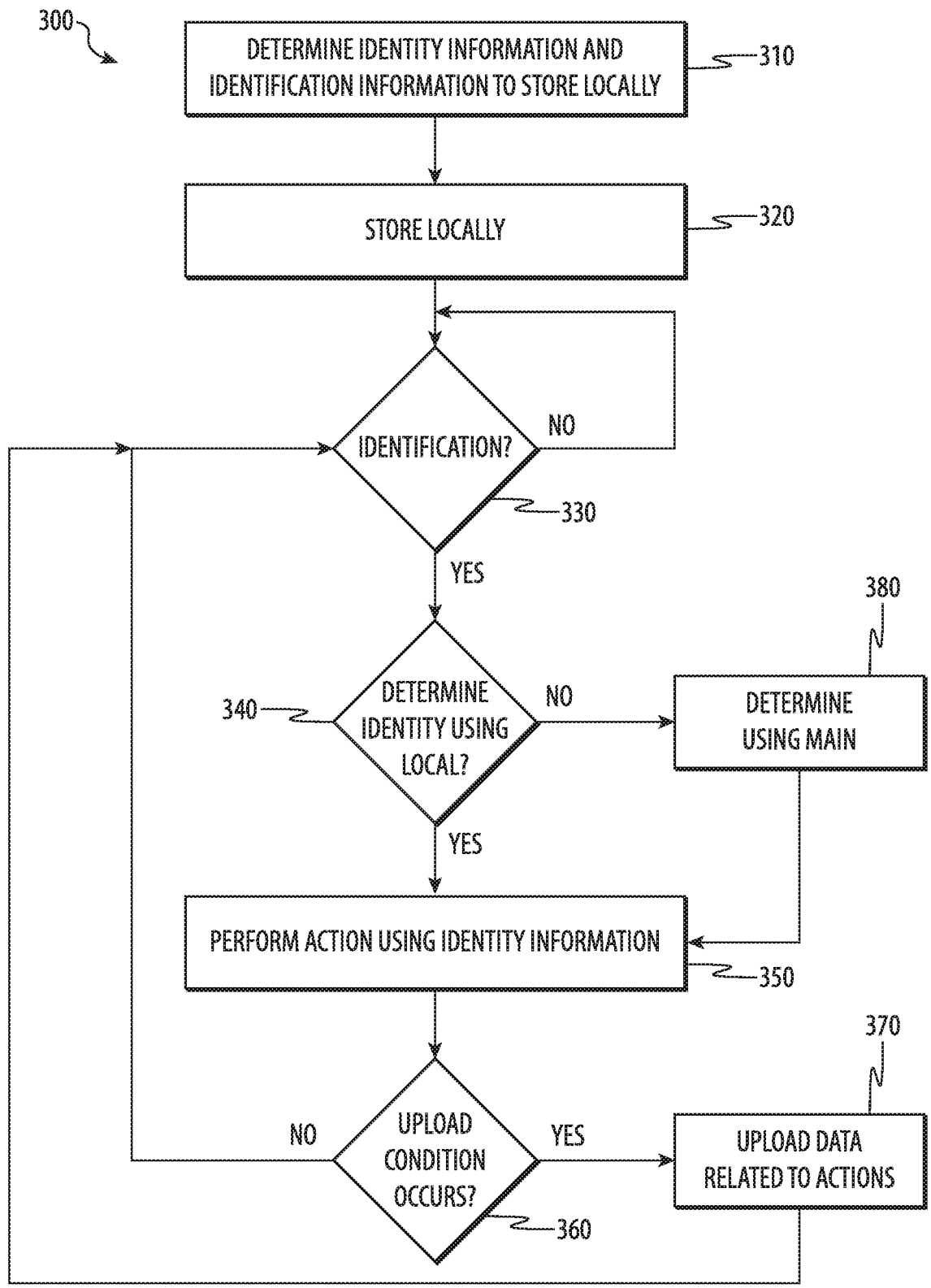
FIG. 3 depicts a flow chart illustrating a first example method for operating a distributed identity system with local identification. This method may be performed by the systems of FIGS. 1 and/or 2.

FIG. 3 depicts a flow chart illustrating a first example method 300 for operating a distributed identity system with local identification. This method 300 may be performed by the systems 100, 200 of FIGS. 1 and/or 2.

At operation 310, one or more electronic devices (such as one or more of the identity system devices 101, 201 and/or the local electronic devices 102A-D, 202 of FIGS. 1 and/or 2) may determine identity information and identification information from a main copy (or main store) to store locally in a local copy (or local store). The electronic device may determine identity information and identification information to store locally based on a function of an electronic device that will use the local copy, the location of the electronic device that will use the local copy, a time period, and/or other factors. For example, when creating a local copy for a security kiosk at an airport, the electronic device may determine to locally store identity information and identification information for all passengers with flights at that airport for the next day.

At operation 320, the electronic device may store the determined identity information and identification information locally. The electronic device may obtain the determined identity information and identification information and store it locally, push or otherwise provide the determined identity information and identification information to the electronic device that is to store the determined identity information and identification information locally, and so on.

At operation 330, the electronic device may determine whether or not to perform an identification. For example, the electronic device may determine to perform an identification upon receipt of user input (such as one or more digital representations of biometrics and so on) that may be used to perform an identification. If so, the flow may proceed to operation 340. Otherwise, the flow may return to operation 330 where the electronic device may again determine whether or not to perform an identification.

At operation 340, the electronic device may determine whether or not identity can be determined using the local copy. For example, the electronic device may compare user input (such as one or more digital representations of biometrics and so on) to identification information stored in the local copy to determine if there is a match. If so, the flow may proceed to operation 350. Otherwise, the flow may proceed to operation 380 where the electronic device may determine the identity using identity information stored in the main copy (and/or obtain the identity information stored in the main copy, the identity information stored in the main copy that is associated with the identity information, and so on) before the flow proceeds to operation 350.

At operation 350, after the electronic device determines the identity, the electronic device may perform one or more actions using identity information associated with the identity. For example, the electronic device may obtain a name stored in the stored identity information in the local copy, determine an entitlement indicated in the identity information stored in the local copy, allow entrance based on an entitlement indicated in the stored identity information in the local copy, update an entitlement indicated in the stored identity information in the local copy based on an action that the electronic device performs, verify an age indicated in the stored identity information in the local copy, process a payment using financial information (such as a credit card, bank account number, rewards account, airline miles, a credit account created by the electronic device using information stored in the stored identity information in the local copy, and so on) in the stored identity information in the local copy, and so on.

The flow may then proceed to operation 360 where the electronic device may determine whether or not an upload condition occurs. An upload condition may be elapse of a time period (such as one hour, 5 hours, one day, and so on), completion of an event, receipt of an upload request, completion of a flight, data to upload reaching a threshold size (such as 5 megabytes, 50 megabytes, 900 megabytes, and so on), and/or any other condition that may trigger a data upload.

If so, the flow may proceed to operation 370 where the electronic device may upload data (such as to an identity system device and/or other electronic device that stores and/or maintains the main copy) related to the performed actions. Otherwise, the flow may return to operation 330 where the electronic device may determine whether or not identity can be determined using the local copy.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as determining the identity information and identification information from a main copy to store locally. However, it is understood that this is an example. In some implementations, the electronic device may omit this determination and instead locally store whatever identity information and identification information from a main copy is provided. Various configurations are possible and contemplated without departing from the scope of the present disclosure.

In various examples, this example method 300 may be implemented as a group of interrelated software modules or components that perform various functions discussed herein. These software modules or components may be executed within a cloud network and/or by one or more computing devices, such as the identity system devices 101, 201 and/or the local electronic devices 102A-D, 202 of FIGS. 1 and/or 2.

Figure 4:
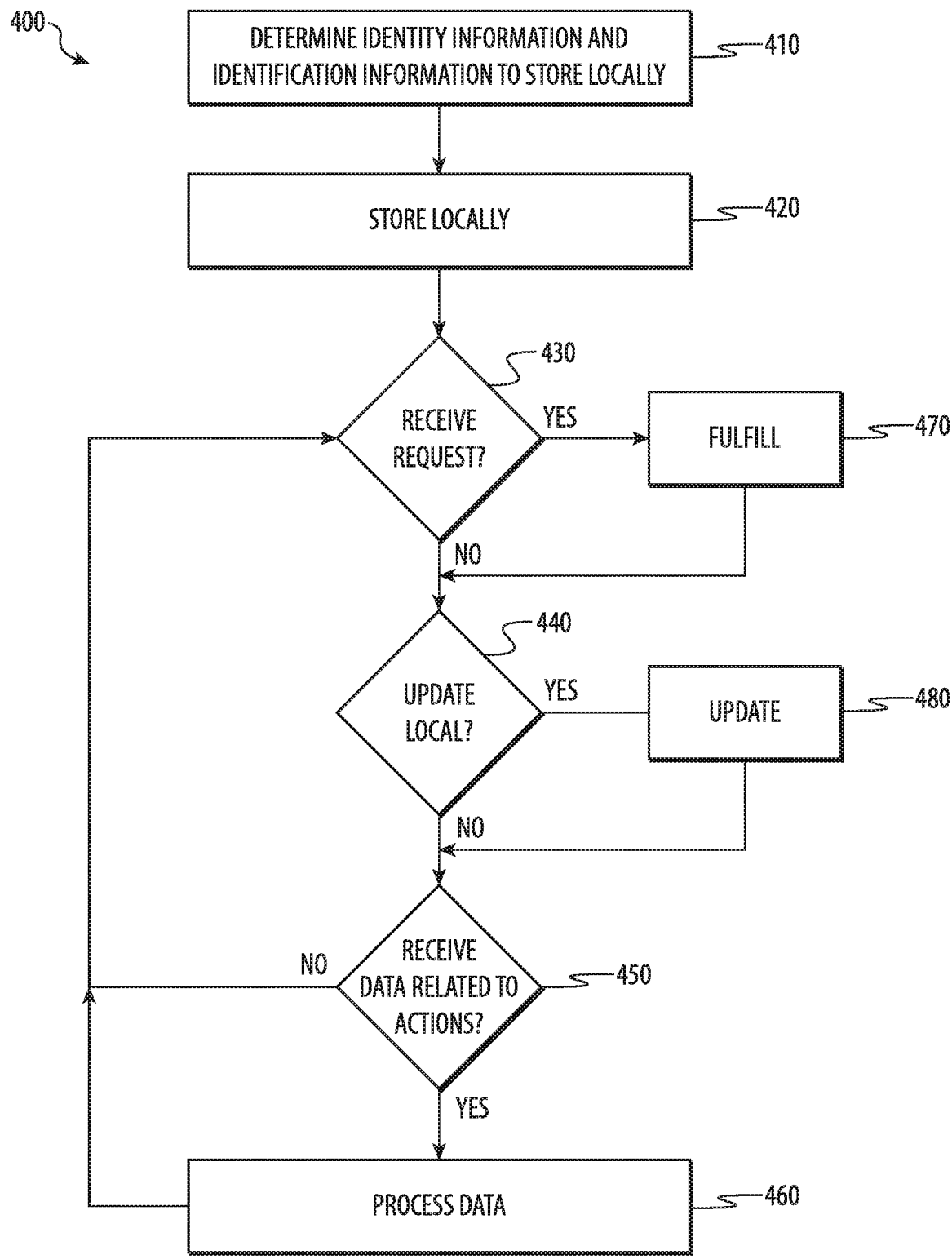
FIG. 4 depicts a flow chart illustrating a second example method for operating a distributed identity system with local identification. This method may be performed by the systems of FIGS. 1 and/or 2.

FIG. 4 depicts a flow chart illustrating a second example method 400 for operating a distributed identity system with local identification. This method 400 may be performed by the systems 100, 200 of FIGS. 1 and/or 2.

At operation 410, an electronic device (such as the identity system devices 101, 201 of FIGS. 1 and/or 2) may determine identity information and identification information from a main copy to store locally. At operation 420, the electronic device may store the determined identity information and identification information locally. For example, the electronic device may receive a request for a local copy from a local electronic device and may transmit the local copy to the local electronic device for the local electronic device to store locally. By way of another example, the electronic device may determine to push the local copy to the local electronic device for the local electronic device to store locally.

At operation 430, the electronic device may determine whether or not a request is received from the local electronic device. For example, the local electronic device may request additional identity information and/or identification information from the main copy, performance of an identification that the local electronic device cannot perform, processing of a payment request, and so on. If so, the flow may proceed to operation 470 where the electronic device may perform the request before the flow proceeds to operation 440. Otherwise, the flow may proceed directly to operation 440.

At operation 440, the electronic device may determine whether or not to update the local copy. For example, the local electronic device may determine to update the local copy if the main copy changes (such as new sets of identity information and/or identification information being added to the main copy and/or new sets of identity information and/or identification information matching conditions under which a portion of the main copy was stored locally in the local copy being added to the main copy), if parameters change that influenced whether or not portions of the main copy were stored locally in the local copy (such as a time period used to select the portion of the main copy have changed, a passenger list used to select the portion of the main copy has changed, and so on), and so on. If so, the flow may proceed to operation 480 where the electronic device may update the local copy (such as by transmitting one or more updates to the local electronic device and so on) before the flow proceeds to operation 450. Otherwise, the flow may proceed directly to operation 450.

At operation 450, the electronic device may determine whether or not data related to one or more actions performed by the local electronic device are received. The electronic device may receive such data from the local electronic devices upon occurrence of one or more upload conditions, upon the local electronic devices determining that the upload condition has occurred, upon request, and so on. If not, the flow may proceed to operation 430 where the electronic device may determine whether or not a request is received from the local electronic device. Otherwise, the flow may proceed to operation 460 where the electronic device may process the data (such as by updating the identity information and/or identification information in the main copy, processing one or more payments, and so on) before the flow returns to operation 430 where the electronic device may determine whether or not a request is received from the local electronic device.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as determining whether or not to update the local copy and updating the local copy. However, it is understood that this is an example. In some implementations, the electronic device may not update the local copy and thus may omit determining whether or not to do so. Various configurations are possible and contemplated without departing from the scope of the present disclosure.

In various examples, this example method 400 may be implemented as a group of interrelated software modules or components that perform various functions discussed herein. These software modules or components may be executed within a cloud network and/or by one or more computing devices, such as the identity system devices 101, 201 of FIGS. 1 and/or 2.

Figure 5:
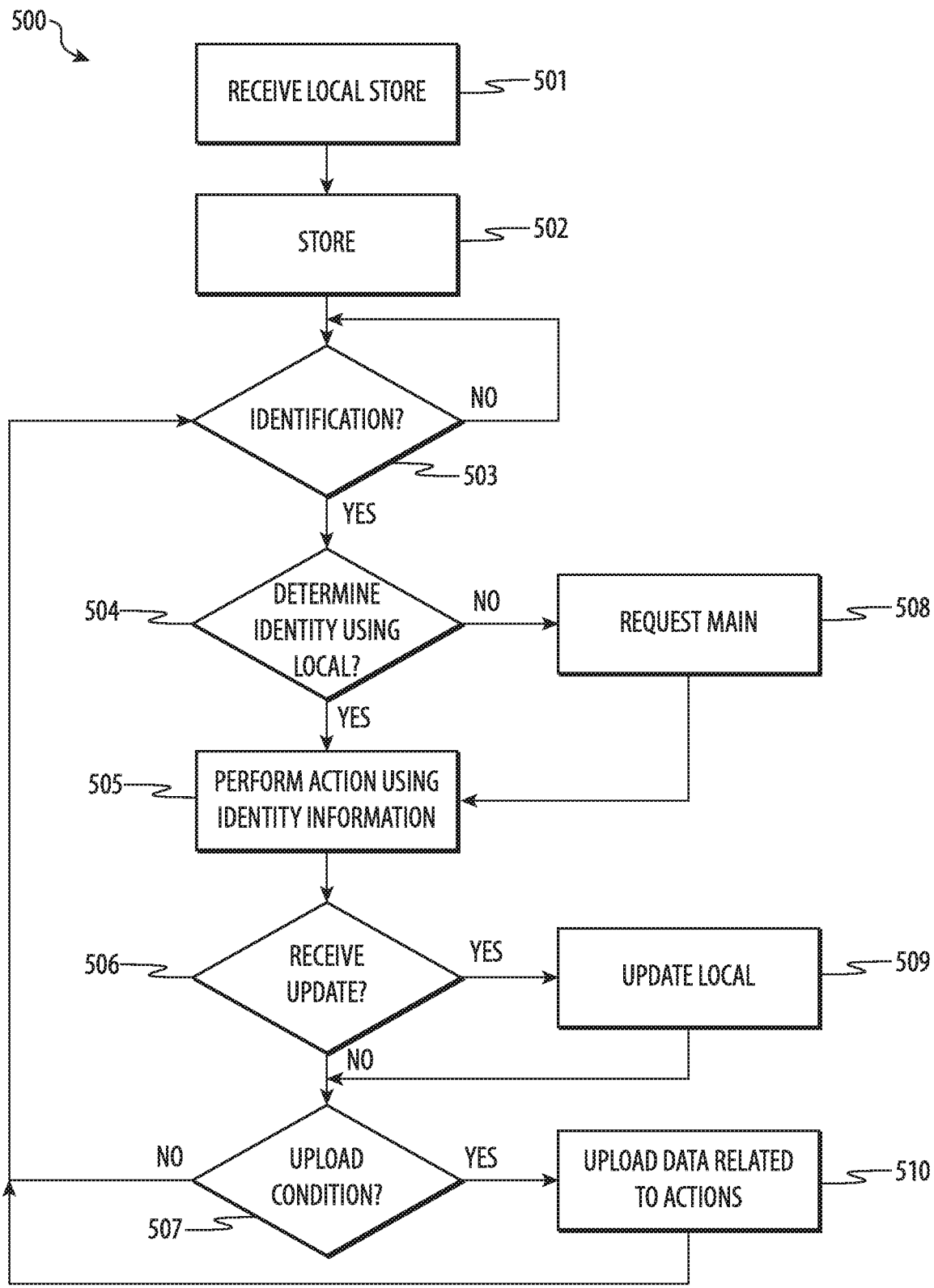
FIG. 5 depicts a flow chart illustrating a third example method for operating a distributed identity system with local identification. This method may be performed by the systems of FIGS. 1 and/or 2.

FIG. 5 depicts a flow chart illustrating a third example method 500 for operating a distributed identity system with local identification. This method 500 may be performed by the systems 100, 200 of FIGS. 1 and/or 2.

At operation 501, an electronic device (such as the local electronic devices 102A-D, 202 of FIGS. 1 and/or 2) may receive a local store (or local copy). The electronic device may receive the local store from an identity system device. In some implementations, the electronic device may receive the local store in response to submitting or transmitting one or more requests. In other implementations, the local store may be pushed to the electronic device. At operation 502, the electronic device may store the local store.

At operation 503, the electronic device may determine whether or not to perform an identification upon receipt of user input (such as one or more digital representations of biometrics and so on). If so, the flow may proceed to operation 504. Otherwise, the flow may return to operation 503 where the electronic device may again determine whether or not to perform an identification.

At operation 504, the electronic device may determine whether or not identity can be determined using the local store. If so, the flow may proceed to operation 505. Otherwise, the flow may proceed to operation 508 where the electronic device may transmit a request to an electronic device that stores the main store from which the local store was derived before the flow proceeds to operation 505. The request may be to obtain the identity information stored in the main store, to obtain the identity information stored in the main store that is associated with the identity information, for an identification to be performed using the main store, and so on.

At operation 505, after the electronic device determines the identity, the electronic device may perform one or more actions using identity information associated with the identity. For example, the electronic device may obtain a name, determine an entitlement, allow entrance based on an entitlement, update an entitlement based on an action that the electronic device performs, verify an age, process a payment using financial information, and so on.

The flow may then proceed to operation 506 where the electronic device may determine whether or not an update to the local store is received. The update to the local store may be received from an identity system device or other electronic device that stores the main store from which the local store was derived. If so, the flow may proceed to operation 509 where the electronic device may update the local store before the flow proceeds to operation 507. Otherwise, the flow may proceed directly to operation 507.

At operation 507, the electronic device may determine whether or not an upload condition has occurred. If so, the flow may proceed to operation 510 where the electronic device may upload data related to any performed actions (such as to an identity system device or other electronic device that stores the main store from which the local store was derived) before the flow returns to operation 503 where the electronic device may determine whether or not to perform an identification. Otherwise, the flow may return directly to operation 503.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as determining whether or not an upload condition occurs after determining whether or not an update is received. However, it is understood that this is an example. In various implementations, these operations may be performed in different orders, performed simultaneously, performed substantially simultaneously, omitted, and so on. Various configurations are possible and contemplated without departing from the scope of the present disclosure.

In various examples, this example method 500 may be implemented as a group of interrelated software modules or components that perform various functions discussed herein. These software modules or components may be executed within a cloud network and/or by one or more computing devices, such as the local electronic devices 102A-D, 202 of FIGS. 1 and/or 2.

Figure 6:
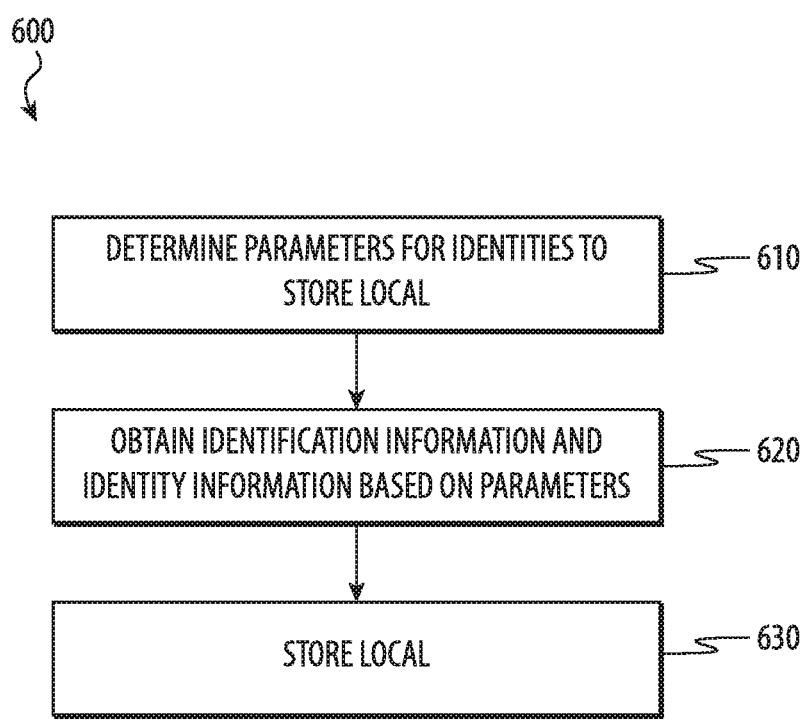
FIG. 6 depicts a flow chart illustrating a fourth example method for operating a distributed identity system with local identification. This method may be performed by the systems of FIGS. 1 and/or 2.

FIG. 6 depicts a flow chart illustrating a fourth example method 600 for operating a distributed identity system with local identification. This method 600 may be performed by the systems 100, 200 of FIGS. 1 and/or 2.

At operation 610, an electronic device (such as the identity system devices 101, 201 and/or the local electronic devices 102A-D, 202 of FIGS. 1 and/or 2) may determine parameters for identities to store local in a local copy (or local store). Such parameters may be associated with the function of an electronic device that will use the local copy, the location of the electronic device that will use the local copy, a time period, and/or other factors. For example, when creating a local copy for a security kiosk at an airport, the parameters may include a list of flight manifests for all passengers with flights at that airport for the next day.

At operation 620, the electronic device may obtain identification information and identity information based on the parameters, such as from a main copy (or main store). For example, the electronic device may obtain a portion of identification information and identity information stored by an identity system device and/or a database maintained by the identity system device that satisfies the parameters.

At operation 630, the electronic device may locally store the obtained identification information and identity information in a local copy at an electronic device that will use the local copy. For example, the electronic device may be the electronic device that will use the local copy and may obtain the identification information and identity information and locally store such. In another example, the electronic device may be an identity system device that may obtain the identification information and identity information and transmit such to the electronic device that will use the local copy for performing identifications.

Although the example method 600 is illustrated and described as including particular operations performed in a particular order, it is understood that this is an example. In various implementations, various orders of the same, similar, and/or different operations may be performed without departing from the scope of the present disclosure.

For example, operation 620 is illustrated and described as obtaining the identification information and identity information. However, in some implementations, the electronic device performing the method 600 may be an identity system device that maintains the identification information and identity information from which the identification information and identity information corresponding to the parameters is derived. In such an example, operation 620 may involve deriving the identification information and identity information corresponding to the parameters from the main copy of the identification information and identity information stored and maintained by the identity system device. Various configurations are possible and contemplated without departing from the scope of the present disclosure.

In various examples, this example method 600 may be implemented as a group of interrelated software modules or components that perform various functions discussed herein. These software modules or components may be executed within a cloud network and/or by one or more computing devices, such as the identity system devices 101, 201 and/or the local electronic devices 102A-D, 202 of FIGS. 1 and/or 2.

In various implementations, a distributed identity system with local identification may include an identity system device that stores identity information and biometric identification information and a local electronic device. The local electronic device may store a local copy of at least a portion of the identity information and the biometric identification information, determine identities by comparing received digital representations of biometrics with the biometric identification information included in the local copy, perform actions using the identity information included in the local copy that corresponds to the identities; and upload data related to the actions to the identity system device upon occurrence of an upload condition.

In some examples, the upload condition may be at least one of elapse of a time period, completion of an event, an upload request received by the local electronic device from the identity system device, the data reaching a threshold size, or completion of a flight. In various examples, the identity system device may determine an update to the local copy and transmit the update to the local electronic device. In some examples, the local electronic device may be operative to change the upload condition.

In various examples, at least part of the identity information may be encrypted using an encryption key and the encryption key may be stored by the identity system device and the local electronic device. In some such examples, the local electronic device may be operative to delete the encryption key stored by the local electronic device. For example, the local electronic device may delete the encryption key in response to an instruction received from the identity system device.

In some embodiments, an electronic device in a distributed identity system with local identification may include a non-transitory storage medium that stores instructions, a biometric reader device, a communication unit, and a processor. The processor may execute the instructions to receive a local store, from an identity system device using the communication unit, that includes at least a portion of identity information and biometric identification information stored by the identity system device; determine identities by comparing digital representations of biometrics, received via the biometric reader device, with the biometric identification information included in the local store; perform actions using the identity information included in the local store that corresponds to the identities; and upload data related to the actions to the identity system device using the communication unit upon occurrence of an upload condition.

In various examples, the actions may include allowing entrance based on a ticket and the processor updates a status of the ticket in the local store based on the entrance. In some examples, the identity information may include a verified age. In various examples, the identity information may include payment information.

In some examples, the electronic device may further include an access control mechanism and the actions may include the processor controlling access by operating the access control mechanism. In various examples, the digital representations of the biometrics may include a digital representation of at least one of a fingerprint, a voiceprint, a facial image, a retina image, an iris image, a heart rhythm or other biological information, or a gait. In some examples, the biometric reader device may include at least one of a fingerprint scanner, an optical fingerprint scanner, a phosphorescent fingerprint scanner, a camera, an image sensor, a heart rhythm monitor or other biological sensor, or a microphone.

In various implementations, an electronic device in a distributed identity system with local identification may include a non-transitory storage medium, a communication unit, and a processor. The non-transitory storage medium may store instructions, identity information, and biometric identification information. The processor may execute the instructions to determine at least a portion of the identity information and the biometric identification information to store at a local electronic device; transmit the portion of the identity information and the biometric identification information to the local electronic device using the communication unit; after occurrence of an upload condition, receive data from the local electronic device using the communication unit, the data related to actions performed by the local electronic device using identity information included in the portion of the identity information and the biometric identification information that corresponds to identities determined by the local electronic device as a result of comparing received digital representations of biometrics to the biometric identification information included in the portion of the identity information and the biometric identification information; and process the data to update the identity information.

In some examples, the local electronic device may be a component of an aircraft and the processor may determine the at least the portion of the identity information and the biometric identification information to store at the local electronic device by selecting the identity information and the biometric identification information that corresponds to a flight manifest for the aircraft. In various examples, the local electronic device may be a ticketing device for an event and the processor may determine the at least the portion of the identity information and the biometric identification information to store at the local electronic device by selecting the identity information and the biometric identification information that corresponds to ticket holders for the event. In some examples, the local electronic device may be a component of a vehicle and the processor may determine the at least the portion of the identity information and the biometric identification information to store at the local electronic device by selecting the identity information and the biometric identification information that corresponds to permitted operators of the vehicle. In various examples, the local electronic device may be a component of a secured area and the processor may determine the at least the portion of the identity information and the biometric identification information to store at the local electronic device by selecting the identity information and the biometric identification information that corresponds to permitted entrants to the secured area.

In some examples, the local electronic device may be a first local electronic device, the portion of the identity information and the biometric identification may be a first portion of the portion of the identity information and the biometric identification, the upload condition is a first upload condition, the data may be first data, the actions may be first actions, the identities may be first identities, and the received digital representations of biometrics may be first received digital representations of biometrics. In such examples, the processor may be operative to determine at least a second portion of the identity information and the biometric identification information to store at a second local electronic device; transmit the second portion of the identity information and the biometric identification information to the second local electronic device using the communication unit; after occurrence of a second upload condition, receive second data from the second local electronic device using the communication unit, the second data related to second actions performed by the second local electronic device using identity information included in the second portion of the identity information and the biometric identification information that corresponds to second identities determined by the second local electronic device as a result of comparing second received digital representations of biometrics to the biometric identification information included in the second portion of the identity information and the biometric identification information; and process the second data to update the identity information.

Figure 7:
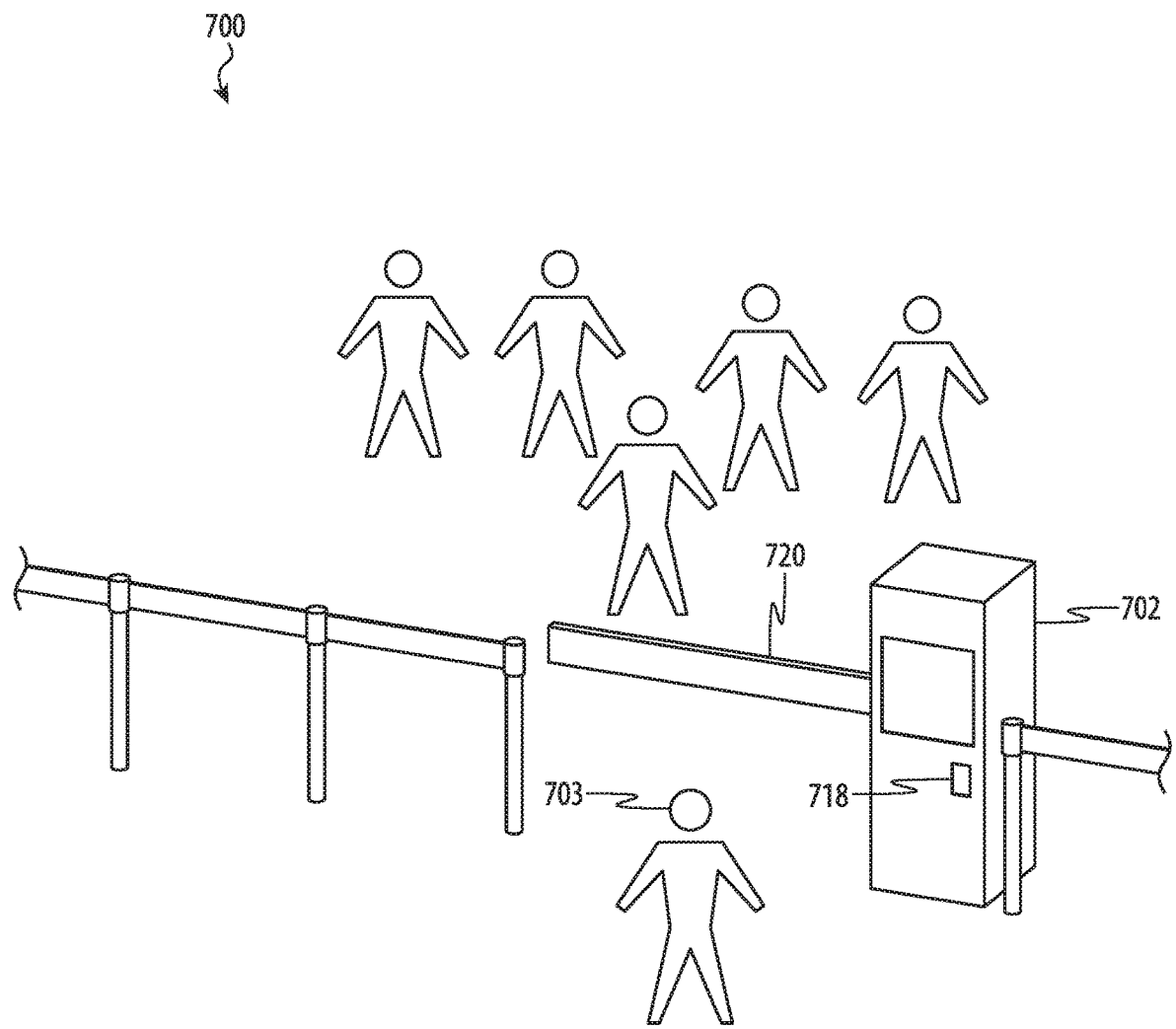
FIG. 7 depicts a third example distributed identity system with local identification.

FIG. 7 depicts a third example distributed identity system 700 with local identification. In this example, the distributed identity system 700 may include a ticket station 702 at a venue that controls access based on whether or not a person 703 has a valid ticket for entrance. The ticket station 702 may include a biometric reader device 718 and an access control mechanism 720. The ticket station 702 may obtain a digital representation of a biometric using the biometric reader device 718, determine an identity by comparing the digital representation of the biometric to stored biometric identification information in a local copy (or local store), and allow access by controlling the access control mechanism 720 if information in the stored identity information in the local copy associated with the identity indicates that the person 703 has a valid ticket for entrance. Upon occurrence of an upload condition, such as completion of an event at the venue corresponding to the ticket, the ticket station 702 may upload data (such as to an identity system device that maintains the identity information from which the stored identity information was obtained) related to allowing access, use of the ticket, change in status of the ticket, other actions the ticket station 702 performs, and so on.

For example, the biometric reader device 718 is illustrated as a fingerprint scanner and the access control mechanism 720 is illustrated as a gate arm. The fingerprint scanner may obtain an image of the person's fingerprint, determine an identity by comparing the image (and/or a hash or other digital representation of the image) to stored fingerprint images (and/or stored hashes or other digital representations of the fingerprint image) in the local copy, and control the gate arm to allow the person 703 inside if a valid ticket is associated with the identity.

Figure 8:
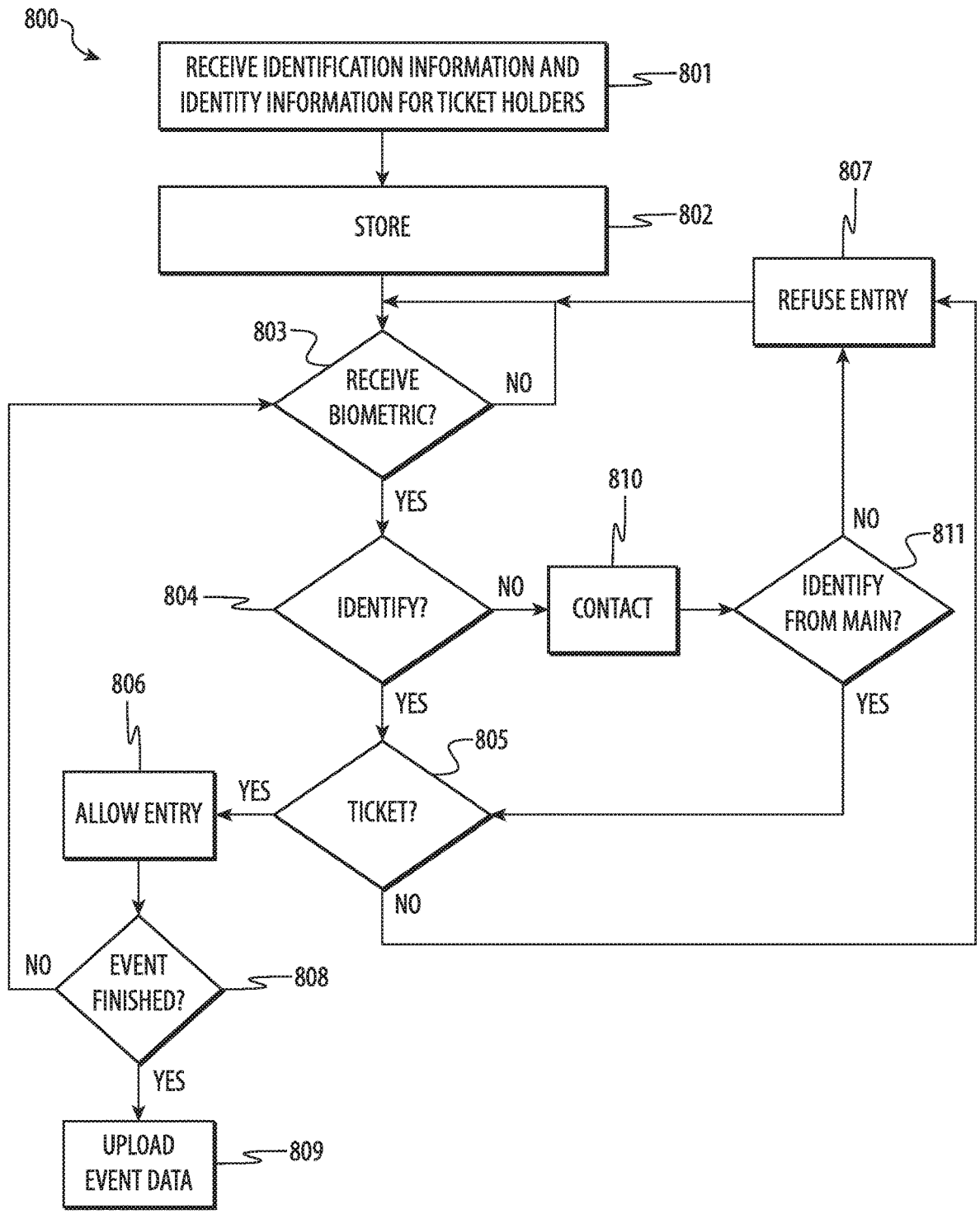
FIG. 8 depicts a flow chart illustrating a fifth example method for operating a distributed identity system with local identification. This method may be performed by the systems of FIGS. 2 and/or 7.

FIG. 8 depicts a flow chart illustrating a fifth example method 800 for operating a distributed identity system with local identification. This method 800 may be performed by the systems 200, 700 of FIGS. 2 and/or 7.

At operation 801, an electronic device (such as the ticket station 702 of FIG. 7) may receive identification information and identity information for ticket holders related to an event at a venue. The flow may proceed to operation 802 where the electronic device may store the data in a local store.

The flow may then proceed to operation 803 where the electronic device may determine whether or not one or more digital representations of biometrics are received. The one or more digital representations of the biometrics may be one or more fingerprints, voiceprints, facial images, retina images, iris images, gaits, a heart rhythms or other biological information, and so on. The one or more digital representations of the biometrics may be obtained using one or more biometric reader devices (such as a fingerprint scanner, an optical fingerprint scanner, a phosphorescent fingerprint scanner, a camera, an image sensor, a microphone, a heart rhythm monitor or other biological sensor, and so on). If so, the flow may proceed to operation 804. Otherwise, the flow may return to operation 803 where the electronic device may again determine whether or not one or more digital representations of biometrics are received.

At operation 804, after the electronic device determines that one or more digital representations of biometrics are received, the electronic device may determine whether or not an identity can be determined using the one or more digital representations of biometrics and the local store (such as by comparing the one or more digital representations of biometrics to stored biometric data stored in the local store). If so, the flow may proceed to operation 805. Otherwise, the flow may proceed to operation 810.

At operation 805, after the electronic device determines that an identity can be determined using the one or more digital representations of biometrics and the local store, the electronic device may determine whether or not identity information in the local store indicates that a valid ticket is associated with the identity. If so, the flow may proceed to operation 806 where the electronic device may allow entry to the event. The electronic device may allow entry by controlling an access control mechanism (such as a gate arm, a door, a turnstile, and/or any other device operable to control entrance). Otherwise, the flow may proceed to operation 807 where the electronic device may refuse entry to the event (such as by controlling the access control mechanism to refuse entrance). The flow may then proceed to operation 808.

At operation 808, the electronic device may determine whether or not the event is finished. For example, the electronic device may store information regarding a time when the event is finished and may compare the stored time to a current time. If the event is finished, the flow may proceed to operation 809 where the electronic device may upload event data (such as uploading information regarding received digital representations of biometrics, tickets used for entrance, determined identities, entrances allowed, entrances refused, and so on to one or more electronic devices, such as an identity system device that maintains the main store from which the local store was derived). Otherwise, the flow may return to operation 803 where the electronic device may determine whether or not one or more digital representations of biometrics are received.

At operation 810, after the electronic device determines that an identity cannot be determined using the one or more digital representations of biometrics and the local store, the electronic device may contact an electronic device (such as an identity system device) that maintains a main store from which the local store was derived. Contact may include transmitting the one or more digital representations of the biometrics. The flow may then proceed to operation 811 where the electronic device may determine whether or not the identity can be determined using the main store (such as whether an identity is provided in response to the contact, identity and/or identity information is provided in response to the contact, ticket information is provided in response to the contact, and so on). If so, the flow may proceed to operation 805 where the electronic device may determine whether or not identity information in the local store indicates that a valid ticket is associated with the identity. Otherwise, the flow may proceed to operation 807 where the electronic device may refuse entry to the event.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as determining whether or not the event is finished after allowing entry. However, it is understood that this is an example. In various implementations, the electronic device may determine whether or not the event is finished at any time without departing from the scope of the present disclosure.

Further, the method 800 is illustrated and described as uploading event data upon determining that the event is finished. However, it is understood that this is an example. In various implementations, the electronic device may upload event data upon determining that any number of different upload conditions have occurred (such as the lapse of a time period, event data reaching a threshold size, and so on). Various configurations are possible and contemplated without departing from the scope of the present disclosure.

In various examples, this example method 800 may be implemented as a group of interrelated software modules or components that perform various functions discussed herein. These software modules or components may be executed within a cloud network and/or by one or more computing devices, such as the local electronic devices 202 of FIG. 2 and/or the ticket station 702 of FIG. 7.

Figure 9:
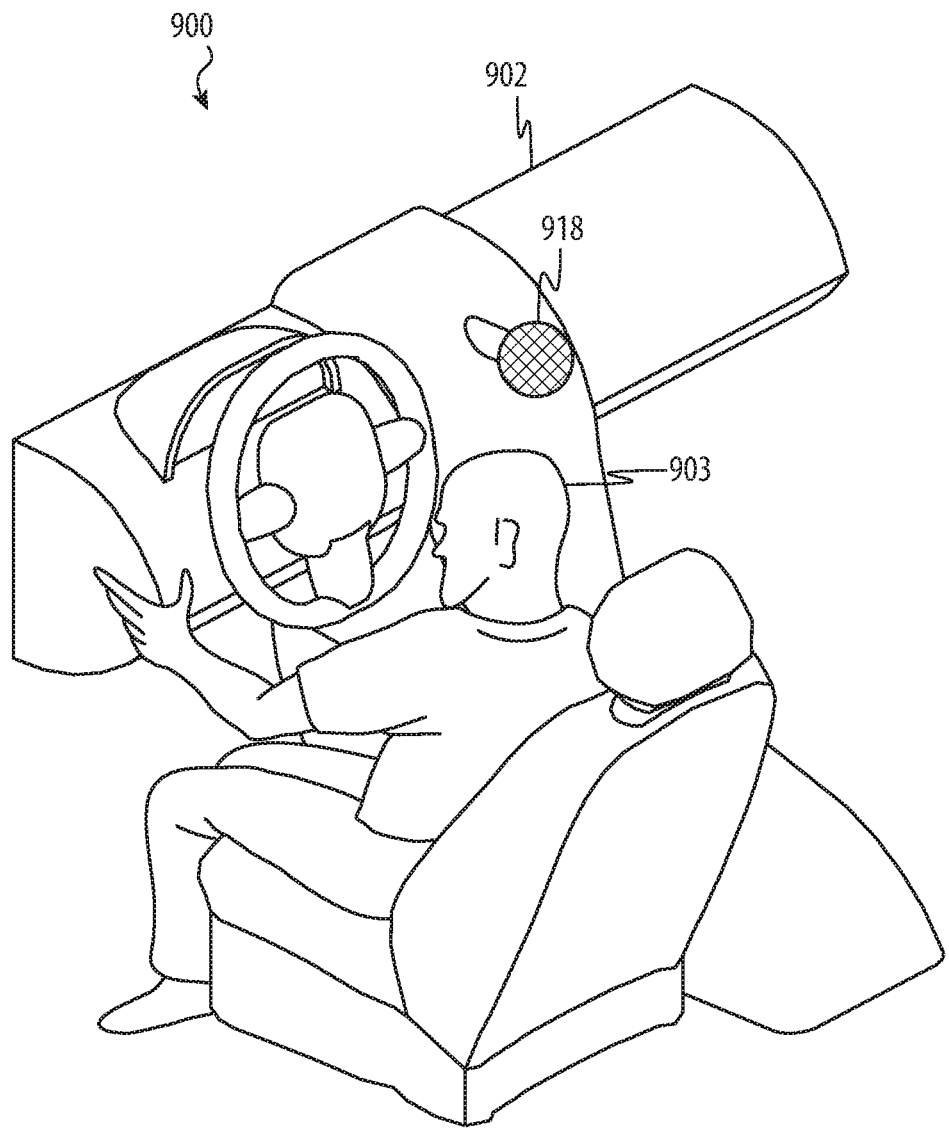
FIG. 9 depicts a fourth example distributed identity system with local identification.

FIG. 9 depicts a fourth example distributed identity system 900 with local identification. In this example, the distributed identity system 900 may include a vehicle 902. The vehicle 902 may include a biometric reader device 918, which is illustrated as a microphone that obtains a voiceprint for a person 903. The vehicle 902 may obtain the voiceprint (and/or another digital representation of a biometric) using the biometric reader device 918 (and/or other biometric reader device), determine an identity by comparing the voice print to stored biometric identification information in a local copy, and allow operation of the vehicle 902 and/or configure the vehicle 902 according to stored identity information in the local copy if the person 903 has permission to operate the vehicle 902 as specified in identity information stored by the vehicle 902 in the local copy. Upon occurrence of an upload condition (such as completion of operation, detection of an emergency, lapse of a time period, and so on), the vehicle 902 may upload data related to operation of the vehicle 902 (such as routes taken, determined identities, provided digital representations of biometrics, determined conditions of the person 903, speed limits or other rules or laws broken using the vehicle 902, and so on), such as to an identity system device or other electronic device that maintains a main copy from which the local copy was derived.

In various implementations, a group of people may have one or more sets of permissions with respect to operating the vehicle 902. In such implementations, the vehicle 902 may store biometric identification information and identity information in the local copy for each of the group of people.

In some implementations, the identity information may specify one or more configuration options for the vehicle 902 for the person 903. For example, such configuration options may include a seat position, vehicle temperature, entertainment system settings, control settings, time and/or location of permitted operation, and so on. In such implementations, the vehicle 902 may control one or more components according to the configuration options upon determining the identity.

Figure 10:
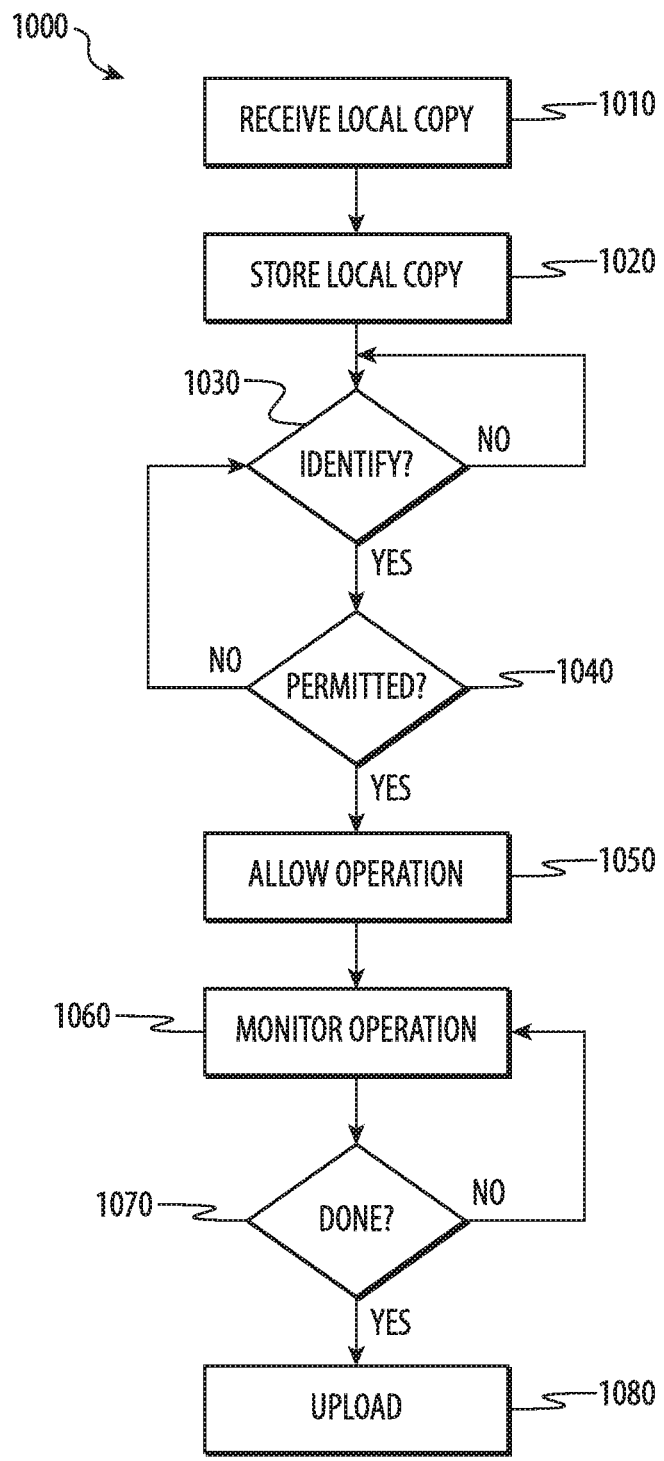
FIG. 10 depicts a flow chart illustrating a sixth example method for operating a distributed identity system with local identification. This method may be performed by the systems of FIGS. 2 and/or 9.

FIG. 10 depicts a flow chart illustrating a sixth example method 1000 for operating a distributed identity system with local identification. This method 1000 may be performed by the systems 200, 900 of FIGS. 2 and/or 9.

At operation 1010, an electronic device (such as the vehicle 902 of FIG. 9) may receive a local copy from an identity system device that maintains a main copy of identity information and biometric identification information. The flow may proceed to operation 1020 where the electronic device stores the local copy.

Next, the flow may proceed to operation 1030 where the electronic device may determine whether or not an identity can be identified, such as by comparing a received digital representation of a biometric to stored biometric identification information in the local copy. If so, the flow may proceed to operation 1040. Otherwise, the flow may return to operation 1030 where the electronic device may again determine whether or not an identity can be identified.

At operation 1040, after the electronic device determines the identity, the electronic device may determine whether or not stored identity information in the local copy associated with the identity indicates that vehicle operation is permitted. If not, the flow may return to operation 1030 where the electronic device may again determine whether or not an identity can be identified. Otherwise, the flow may proceed to operation 1050.

At operation 1050, the electronic device may allow use of the vehicle. The flow may then proceed to operation 1060 where the electronic device may monitor operation of the vehicle. Next, the flow may proceed to operation 1070 where the electronic device may determine whether or not use of the vehicle is over. If not, the flow may return to operation 1060 where the electronic device may continue to monitor operation of the vehicle. Otherwise, the flow may proceed to operation 1080 where the electronic device may upload data from the monitored use of the vehicle, such as to an identity system device or other electronic device that maintains the main copy from which the local copy was derived.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described in the context of operation of a vehicle. However, it is understood that this is an example. In various implementations, similar methods may be used in the context of any kind of electronic device operation, such as mobile telephone operation, laptop computer operation, digital media player operation, kitchen appliance operation, and so on. Various configurations are possible and contemplated without departing from the scope of the present disclosure.

In various examples, this example method 1000 may be implemented as a group of interrelated software modules or components that perform various functions discussed herein. These software modules or components may be executed within a cloud network and/or by one or more computing devices, such as the local electronic devices 202 of FIG. 2 and/or the vehicle 902 of FIG. 9.

Figure 11:
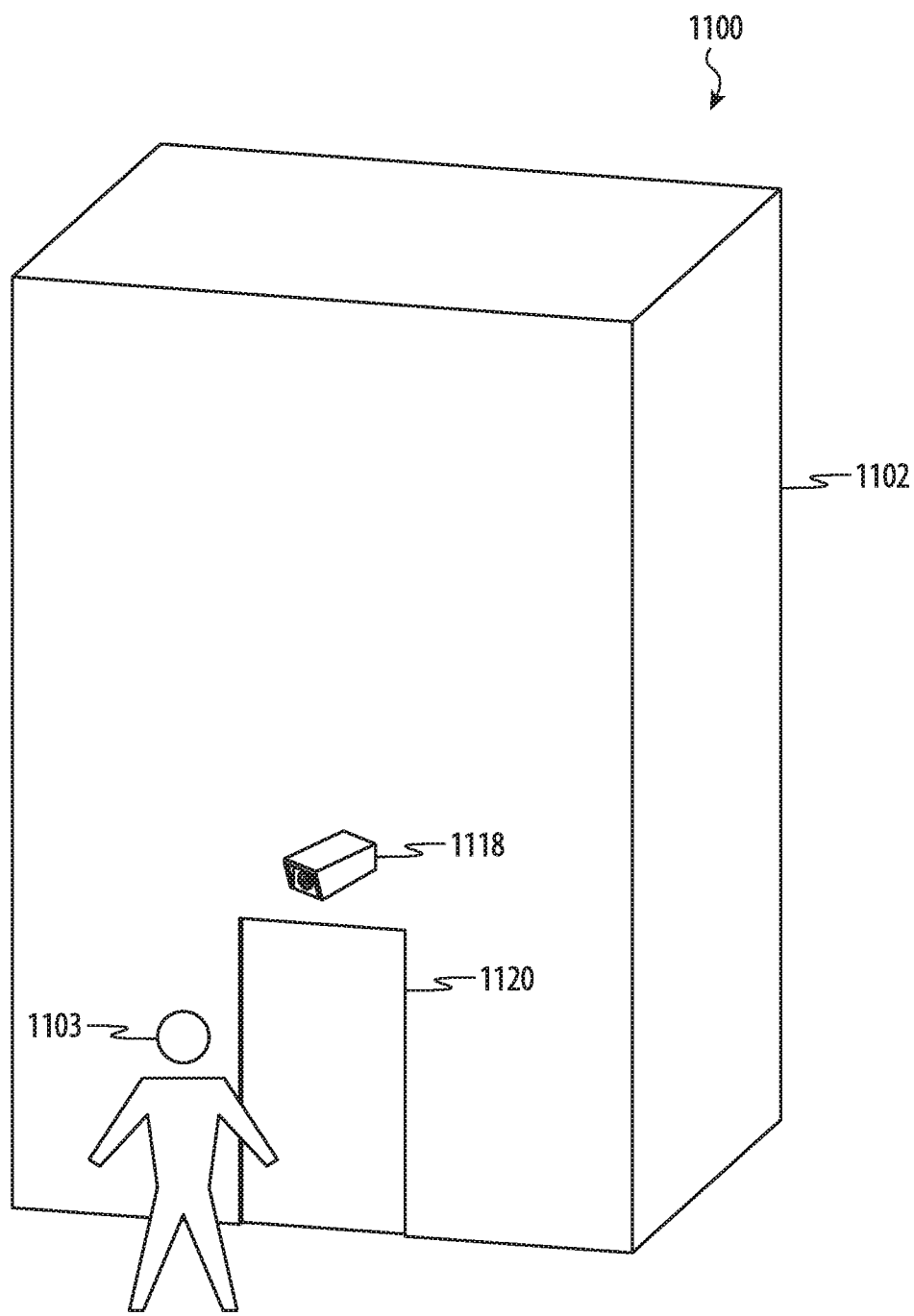
FIG. 11 depicts a fifth example distributed identity system with local identification.

FIG. 11 depicts a fifth example distributed identity system 1100 with local identification. In this example, the distributed identity system 1100 may be an automated controlled access building 1102. The automated controlled access building 1102 may include a biometric reader device 1118 and an access control mechanism 1120. The automated controlled access building 1102 may obtain a digital representation of a biometric using the biometric reader device 1118, determine an identity by comparing the digital representation of the biometric to stored biometric identification information in a local copy, and allow access by controlling the access control mechanism 1120 if information in stored identity information in the local copy associated with the identity indicates that a person 1103 has permission to enter the automated controlled access building 1102.

For example, the biometric reader device 1118 is illustrated as a camera and the access control mechanism 1120 is illustrated as an automated door. The camera may obtain an image of the person's face, determine an identity by comparing the image to stored facial images in the local copy, and control the automated door to allow the person 1103 inside if the person 1103 has permission to enter the automated controlled access building 1102.

The automated controlled access building 1102 may also upload data (such as data relating to digital representations of biometrics received, identities determined, accesses allowed or prohibited, and so on). For example, the automated controlled access building 1102 may upload such data to an identity system device that maintains a main copy from which the local copy was derived or received.

In some implementations, the automated controlled access building 1102 may upload the data as soon as collected. In other implementations, the automated controlled access building 1102 may upload the data upon the occurrence of an upload condition. By way of example, the automated controlled access building 1102 may upload the data upon the occurrence of the upload condition in order to minimize communication network traffic.

By way of another example, the automated controlled access building 1102 may be a secured area and the operator of the secured area may protect real time access to people entering the automated controlled access building 1102. To illustrate, the automated controlled access building 1102 may upload the data once per day in order to maintain accurate logs of people who enter but restrict real time access to such data.

In other examples, the automated controlled access building 1102 may be operable to switch between immediate upload and upload when the upload condition occurs. For example, the automated controlled access building 1102 may operate in an unsecure mode where data is uploaded immediately and a secure mode where the data is uploaded upon occurrence of an upload condition. In such an example, the automated controlled access building 1102 may be operable to switch between the secure and unsecure modes, such as in response to a transmitted notification to switch modes.

In various examples, the automated controlled access building 1102 may be operable to change the upload condition. For example, the automated controlled access building 1102 may upload the data every 4 hours, determine that communication network traffic is high, and switch to uploading the data every 8 hours. Various configurations are possible and contemplated without departing from the scope of the present disclosure.

In another example, the automated controlled access building 1102 may store a local copy of a portion of one or more third party databases and/or other electronic devices that relate to access. For example, the automated controlled access building 1102 may store a local copy of a portion of a law enforcement wanted list and/or other blacklist, criminal watch list, and so on. In some implementations, the automated controlled access building 1102 may store a local copy of the portion of such a third party database and/or other electronic device associated with all of the people who have permission to enter. In this way, the automated controlled access building 1102 may be able to use the information from the third party database and/or other electronic device without actually currently communicating with the third party database and/or other electronic device. Various configurations are possible and contemplated without departing from the scope of the present disclosure.

Figure 12:
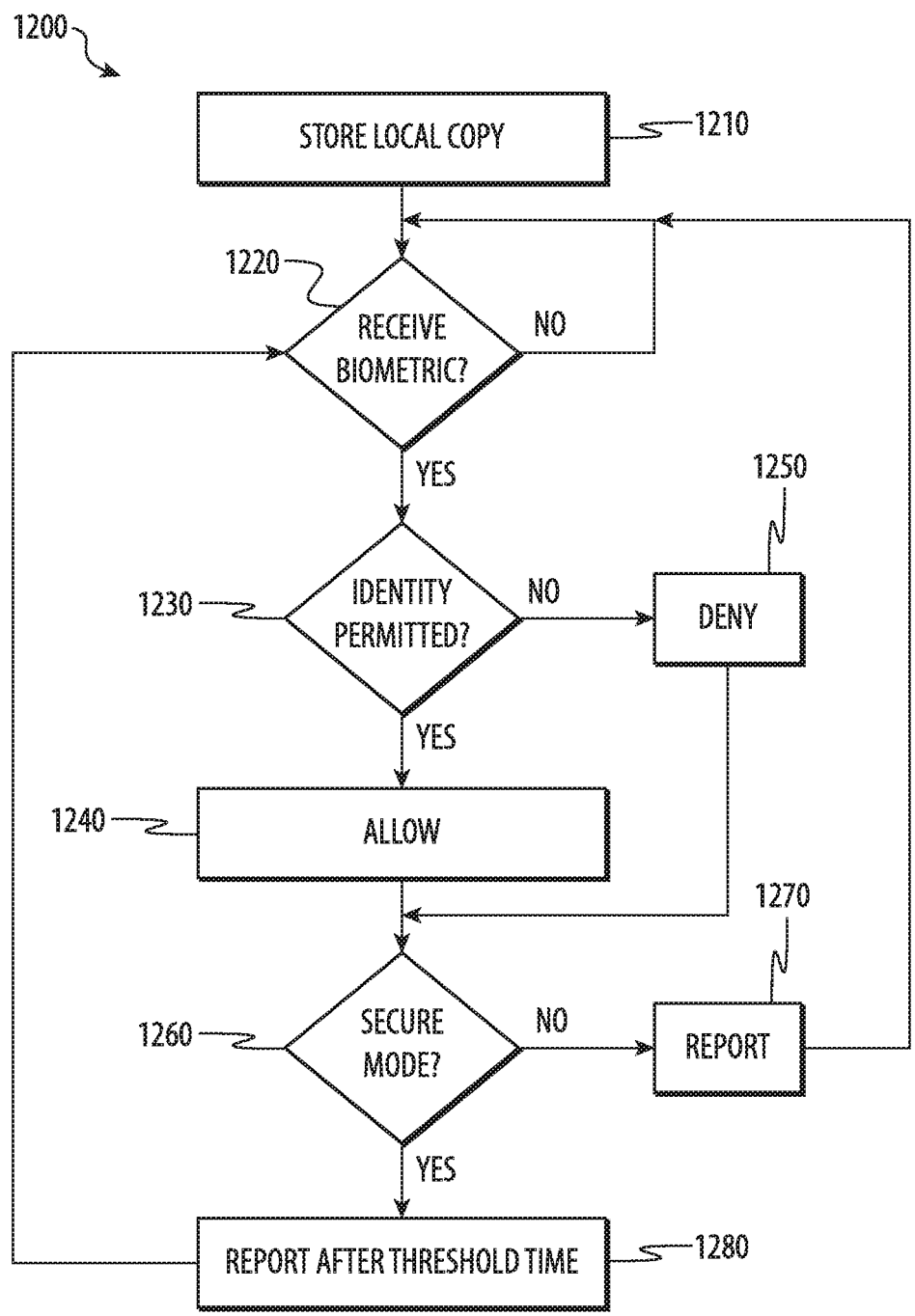
FIG. 12 depicts a flow chart illustrating a seventh example method for operating a distributed identity system with local identification. This method may be performed by the systems of FIGS. 2 and/or 11.

FIG. 12 depicts a flow chart illustrating a seventh example method 1200 for operating a distributed identity system with local identification. This method 1200 may be performed by the systems 200, 1100 of FIGS. 2 and/or 11.

At operation 1210, an electronic device (such as the automated controlled access building 1102 of FIG. 11) may store a local copy of identity information and biometric identification information that is derived from an identity system device that maintains a main copy of such information. For example, the local copy may be received from an identity system device that maintains the main copy from which the local copy is derived.

The flow may proceed to operation 1220 where the electronic device may determine whether or not one or more digital representations of biometrics are received, such as from one or more people attempting to enter a building or other secure area. If so, the flow may proceed to operation 1230. Otherwise, the flow may return to operation 1220 where the electronic device may again determine whether or not one or more digital representations of biometrics are received.

At operation 1230, the electronic device may compare the one or more digital representations of biometrics to biometric identification information stored in the local copy, determine an identity based thereon, and use associated stored identity information in the local copy to determine if access is permitted. If so, the flow may proceed to operation 1240 where the electronic device may allow access before the flow proceeds to operation 1260. Otherwise, the flow may proceed to operation 1250 where the electronic device may deny access before the flow proceeds to operation 1260.

At operation 1260, the electronic device may determine if the electronic device is operating in secure mode. If so, the flow may proceed to operation 1280 where the electronic device may report or upload data (such as data regarding received digital representations of biometrics, determined identities, access allowed or denied, and so on to an electronic device like the identity system device that maintains the main copy from which the local copy is derived) and the flow may return to operation 1220 where the electronic device may again determine whether or not one or more digital representations of biometrics are received. Otherwise, the flow may proceed to operation 1270 where the electronic device may report or upload the data and the flow may return to operation 1220 where the electronic device may again determine whether or not one or more digital representations of biometrics are received.

Although the example method 1200 is illustrated and described as including particular operations performed in a particular order, it is understood that this is an example. In various implementations, various orders of the same, similar, and/or different operations may be performed without departing from the scope of the present disclosure.

For example, the method 1200 is illustrated and described as using one or more digital representations of biometrics to perform identifications. However, it is understood that this is an example. In various implementations, the electronic device may use other information other than biometrics to determine identities. For example, in some implementations, an electronic device may determine a social media account associated with a person and determine an identity for that person based on information contained in that social media account and/or one or more connections to that social media account from other social media accounts and/or other information sources. Various configurations are possible and contemplated without departing from the scope of the present disclosure.

In various examples, this example method 1200 may be implemented as a group of interrelated software modules or components that perform various functions discussed herein. These software modules or components may be executed within a cloud network and/or by one or more computing devices, such as the local electronic devices 202 of FIG. 2 and/or the automated controlled access building 1102 of FIG. 11.

Figure 13:
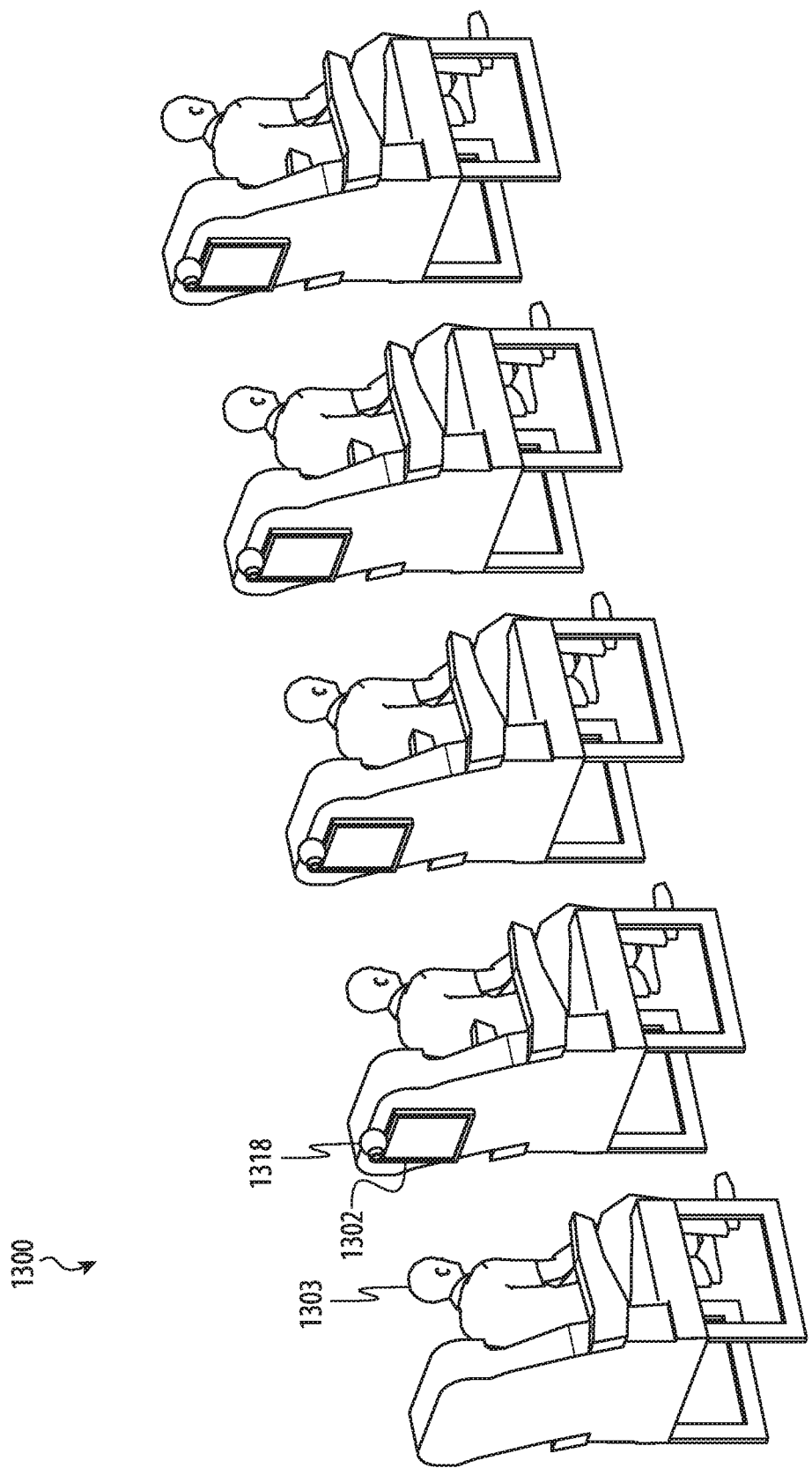
FIG. 13 depicts a sixth example distributed identity system with local identification.

FIG. 13 depicts a sixth example distributed identity system 1300 with local identification. In this example, the distributed identity system 1300 may include an individual point of sale device 1302 on an airplane. The individual point of sale device 1302 may include a biometric reader device 1318. A person 1303 may use the individual point of sale device 1302 to request goods and/or services, such as an alcoholic beverage. The individual point of sale device 1302 may obtain a digital representation of a biometric using the biometric reader device 1318, determine an identity by comparing the digital representation of the biometric to stored biometric identification information in a local copy, and arrange for a request to be fulfilled or denied based on information in stored identity information in the local copy associated with the identity. When the flight ends, the individual point of sale device 1302 may upload data related to any identifications that were made during the flight, transactions that were performed during the flight, and so on.

For example, the individual point of sale device 1302 may store identity information and biometric identification information in a local copy for all of the passengers on a plane's flight manifest. As everyone on a plane should be on the plane's flight manifest, the individual point of sale device 1302 may be able to minimize the amount of identity information and biometric identification information to be stored in order to operate and be able to operate while out of communication and update centralized data once the flight is over and communication with centralized data is again is available.

The individual point of sale device 1302 may then receive a request for an alcoholic beverage from the person 1303, use the biometric reader device 1318 (shown as a camera that obtains a facial image, an iris image, a retina image, and so on) to obtain a digital representation of a biometric, identify the person 1303, determine a verified age for the person from the stored identity information in the local copy associated with the person's identity, and arrange for the request to be fulfilled (such as by signaling cabin crew to fulfill the request, dispensing the alcoholic beverage, and so on) if the person's verified age meets a legal threshold (such as twenty one years of age, eighteen years of age, and so on) for the consumption of alcoholic beverages. The individual point of sale device 1302 may also determine payment information associated with the person's identity and process payment using the payment information. This may enable the individual point of sale device 1302 to verify age and/or payment for requested alcoholic beverages during a flight even if the individual point of sale device 1302 cannot currently communicate with a central data storing age and/or payment information from which the local copy is derived.

By way of another example, one or more electronic devices on an aircraft or at another location may store a local copy of identification information and/or identity information for one or more pilots and/or other staff scheduled to use and/or work on the aircraft. Should a person report as staff whose identification information and/or identity information is not stored in the local copy, additional security procedures may be performed to ensure the person is validly assigned to use and/or work on the aircraft. Various configurations are possible and contemplated without departing from the scope of the present disclosure.

Figure 14:
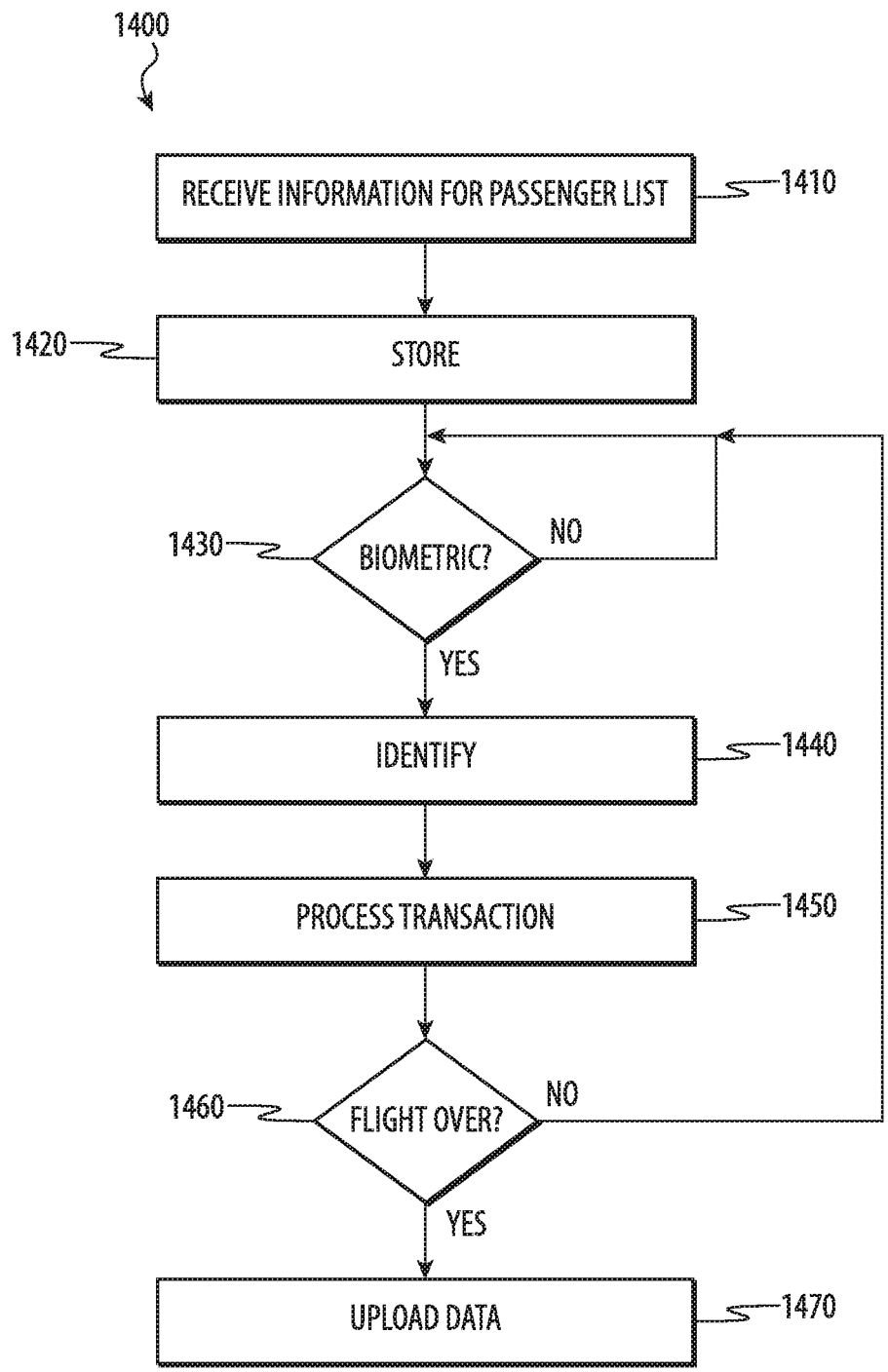
FIG. 14 depicts a flow chart illustrating an eighth example method for operating a distributed identity system with local identification. This method may be performed by the systems of FIGS. 2 and/or 13.

FIG. 14 depicts a flow chart illustrating an eighth example method 1400 for operating a distributed identity system with local identification. This method 1400 may be performed by the systems 200, 1300 of FIGS. 2 and/or 13.

At operation 1410, an electronic device (such as the individual point of sale device 1302 of FIG. 13) may receive information for a passenger list. For example, the electronic device may receive identity information and biometric identification information associated with identities corresponding to the passenger list for a flight. The flow may proceed to operation 1420 where the electronic device may store the information in a local copy (or local store).

The flow may then proceed to operation 1430 where the electronic device may determine whether or not one or more digital representations of biometrics are received. If not, the flow may return to operation 1430 where the electronic device may again determine whether or not one or more digital representations of biometrics are received. Otherwise, the flow may proceed to operation 1440.

At operation 1440, the electronic device may determine an identity using the one or more digital representations of the biometrics and the local copy. Next, the flow may proceed to operation 1450 where the electronic device may process one or more transactions using identity information in the local copy associated with the identity. The flow may then proceed to operation 1460.

At operation 1460, the electronic device may determine whether or not the flight is over. If so, the flow may proceed to operation 1470 where the electronic device may upload data regarding any transactions, received digital representations of biometrics, identifications, and so on. Otherwise, the flow may return to operation 1430 where the electronic device may again determine whether or not one or more digital representations of biometrics are received.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 is illustrated and described in the context of a flight. However, it is understood that this is an example. In other implementation, the method 1400 may be used in other contexts, such as a train trip, a bus ride, and so on. For example, a ticket list may be used to store a local copy of identity information and biometric identification information from a main copy at point of sale devices at seats in an event venue and people at those seats may be able to use those point of sale devices to order and/or pay for concessions, obtain information about the event, change ticket information, access and/or utilize a rewards account associated with their identity, and/or perform various other actions. Various configurations are possible and contemplated without departing from the scope of the present disclosure.

In various examples, this example method 1400 may be implemented as a group of interrelated software modules or components that perform various functions discussed herein. These software modules or components may be executed within a cloud network and/or by one or more computing devices, such as the local electronic devices 202 of FIG. 2 and/or the individual point of sale device 1302 of FIG. 13.

Although the present disclosure is illustrated and described in the context of caching at local electronic devices that store local copies of information from one or more identity system devices and updating the one or more identity system devices and update data related to actions performed to the one or more identity system devices upon the occurrence of one or more upload conditions, it is understood that this is an example. In some implementations, the one or more identity system devices may include a number of identity system devices that operate in a cooperative computing arrangement. In such implementations, one or more of the identity system devices in the cooperative computing arrangement may receive updates from the local electronic devices and subsequently use the techniques disclosed herein to provide those updates to other identity system devices in the cooperative computing arrangement, such as examples where identity system devices are located in each time zone and communicate updates received from local electronic devices to identity system devices in an adjacent time zone upon the occurrence of various upload conditions, such as hourly. Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to a distributed identity system with local identification. The distributed identity system includes an identity system device and at least one local electronic device. The local electronic device locally stores at least a portion of identity information and the biometric identification information stored by the identity system device. The local electronic device determines identities by comparing received digital representations of biometrics with locally stored biometric identification information, performs actions using locally stored identity information included in the local copy, and uploads data related to the actions to the identity system device upon occurrence of an upload condition. In this way, the system performs identifications locally without requiring communication between components of the system but also uses the system to centrally store and maintain the identity information and the identification information that is used to protect the identity information.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A distributed identity system with local identification, comprising:
    a local electronic device; and
    an identity system device that:
        stores identity information and biometric identification information; and
        generates a portion of the identity information and the biometric identification information according to parameters received from the local electronic device, the portion of the identity information and the biometric identification information being a subset of the identity information and the biometric identification information;
    wherein the local electronic device:
        stores a local copy of the portion of the identity information and the biometric identification information;
        determines identities by comparing received digital representations of biometrics with the biometric identification information included in the local copy;
        performs actions using the identity information included in the local copy that corresponds to the identities; and
        uploads data related to the actions to the identity system device upon occurrence of an upload condition.

2. The distributed identity system with local identification of claim 1, wherein the identity system device transmits the portion of the identity information and the biometric identification information to the local electronic device.

3. The distributed identity system with local identification of claim 1, wherein the identity system device:
    determines an update to the local copy; and
    transmits the update to the local electronic device.

4. The distributed identity system with local identification of claim 1, wherein the local electronic device is operative to change the upload condition.

5. The distributed identity system with local identification of claim 1, wherein:
    at least part of the identity information is encrypted using an encryption key; and
    the encryption key is stored by the identity system device and the local electronic device.

6. The distributed identity system with local identification of claim 5, wherein the local electronic device is operative to delete the encryption key stored by the local electronic device.

7. The distributed identity system with local identification of claim 6, wherein the local electronic device deletes the encryption key in response to an instruction received from the identity system device.

8. An electronic device in a distributed identity system with local identification, comprising:
    a non-transitory storage medium that stores instructions;
    a biometric reader device; and
    a processor that executes the instructions to:
        receive a local store, from an identity system device, that includes a portion of identity information and biometric identification information stored by the identity system device, the portion of the identity information and the biometric identification information generated by the identity system device according to parameters received from the electronic device, the portion of the identity information and the biometric identification information being a subset of the identity information and the biometric identification information;
        determine identities by comparing digital representations of biometrics, received via the biometric reader device, with the biometric identification information included in the local store;
        perform actions using the identity information included in the local store that corresponds to the identities; and
        upload data related to the actions to the identity system device upon occurrence of an upload condition.

9. The electronic device of claim 8, wherein:
    the actions comprise allowing entrance based on a ticket; and
    the processor updates a status of the ticket in the local store based on the entrance.

10. The electronic device of claim 8, wherein the identity information includes a verified age.

11. The electronic device of claim 8, wherein the identity information includes payment information.

12. The electronic device of claim 8, wherein the electronic device further comprises an access control mechanism and the actions comprise the processor controlling access by operating the access control mechanism.

13. The electronic device of claim 8, wherein the digital representations of the biometrics comprise a digital representation of at least one of a fingerprint, a voiceprint, a facial image, a retina image, an iris image, or a gait.

14. The electronic device of claim 8, wherein the biometric reader device comprises at least one of a fingerprint scanner, an optical fingerprint scanner, a phosphorescent fingerprint scanner, a camera, an image sensor, or a microphone.

15. An electronic device in a distributed identity system with local identification, comprising:
    a non-transitory storage medium that stores:
        instructions;
        identity information; and
        biometric identification information; and
    a processor that executes the instructions to:
        determine a portion of the identity information and the biometric identification information to store at a local electronic device according to parameters received from the local electronic device, the portion of the identity information and the biometric identification information being a subset of the identity information and the biometric identification information;
transmit the portion of the identity information and the biometric identification information to the local electronic device;
after occurrence of an upload condition, receive data from the local electronic device, the data related to actions performed by the local electronic device using identity information included in the portion of the identity information and the biometric identification information that corresponds to identities determined by the local electronic device as a result of comparing received digital representations of biometrics to the biometric identification information included in the portion of the identity information and the biometric identification information; and
process the data to update the identity information.

16. The electronic device of claim 15, wherein:
the local electronic device comprises a component of an aircraft; and
the processor determines the portion of the identity information and the biometric identification information to store at the local electronic device by selecting the identity information and the biometric identification information that corresponds to a flight manifest for the aircraft.

17. The electronic device of claim 15, wherein:
the local electronic device comprises a ticketing device for an event; and
the processor determines the portion of the identity information and the biometric identification information to store at the local electronic device by selecting the identity information and the biometric identification information that corresponds to ticket holders for the event.

18. The electronic device of claim 15, wherein:
the local electronic device comprises a component of a vehicle; and
the processor determines the portion of the identity information and the biometric identification information to store at the local electronic device by selecting the identity information and the biometric identification information that corresponds to permitted operators of the vehicle.

19. The electronic device of claim 15, wherein:
the local electronic device comprises a component of a secured area; and
the processor determines the portion of the identity information and the biometric identification information to store at the local electronic device by selecting the identity information and the biometric identification information that corresponds to permitted entrants to the secured area.

20. The electronic device of claim 15, wherein:
the local electronic device is a first local electronic device;
the portion of the identity information and the biometric identification information is a first portion of the portion of the identity information and the biometric identification information;
the upload condition is a first upload condition;
the data is first data;
the actions are first actions;
the identities are first identities;
the received digital representations of the biometrics are first received digital representations of biometrics; and
the processor is operative to:
determine at least a second portion of the identity information and the biometric identification information to store at a second local electronic device;
transmit the at least the second portion of the identity information and the biometric identification information to the second local electronic device;
after occurrence of a second upload condition, receive second data from the second local electronic device, the second data related to second actions performed by the second local electronic device using identity information included in the at least the second portion of the identity information and the biometric identification information that corresponds to second identities determined by the second local electronic device as a result of comparing second received digital representations of biometrics to the biometric identification information included in the at least the second portion of the identity information and the biometric identification information; and
process the second data to update the identity information.

* * * * *